United States Patent
Cho et al.

(10) Patent No.: US 11,423,851 B2
(45) Date of Patent: Aug. 23, 2022

(54) IMAGE SENSOR DRIVING CIRCUIT INCLUDING POWER SWITCH AND IMAGE SENSOR INCLUDING THE SAME

(71) Applicant: SAMSUNG ELECTRONICS CO., LTD., Suwon-si (KR)

(72) Inventors: Kyuik Cho, Hwaseong-si (KR); Jaejung Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/940,535

(22) Filed: Jul. 28, 2020

(65) Prior Publication Data
US 2021/0201835 A1 Jul. 1, 2021

(30) Foreign Application Priority Data
Dec. 26, 2019 (KR) .......................... 10-2019-0175243

(51) Int. Cl.
| | |
|---|---|
| *G09G 3/20* | (2006.01) |
| *G09G 3/34* | (2006.01) |
| *G06T 3/40* | (2006.01) |
| *G06T 7/30* | (2017.01) |
| *G06F 1/3203* | (2019.01) |

(52) U.S. Cl.
CPC ......... *G09G 3/3426* (2013.01); *G06T 3/4084* (2013.01); *G06T 7/30* (2017.01); *G06F 1/3203* (2013.01)

(58) Field of Classification Search
CPC ....... G09G 3/3426; G06T 7/30; G06T 3/4084; G06F 1/3203

USPC .......................................................... 345/55
See application file for complete search history.

(56) References Cited

U.S. PATENT DOCUMENTS

| | | | |
|---|---|---|---|
| 7,868,479 B2 | 1/2011 | Subramaniam | |
| 8,411,183 B2 | 4/2013 | Kato et al. | |
| 8,730,363 B2 | 5/2014 | Nishi | |
| 9,270,908 B2 | 2/2016 | Chou et al. | |
| 9,986,179 B2 | 5/2018 | Govil | |
| 2003/0193594 A1* | 10/2003 | Tay | H04N 5/35581 348/308 |
| 2009/0001814 A1* | 1/2009 | Subramaniam | G06F 1/3287 307/39 |
| 2013/0002901 A1 | 1/2013 | Athreya | |
| 2016/0142653 A1* | 5/2016 | Cho | H04N 5/378 348/296 |
| 2019/0082125 A1 | 3/2019 | Smith et al. | |

(Continued)

*Primary Examiner* — Jennifer T Nguyen
(74) *Attorney, Agent, or Firm* — Sughrue Mion, PLLC

(57) ABSTRACT

A driver circuit of an image sensor is provided. The driver circuit includes a row decoder to decode an address of a target row of a pixel array and generate an operation directing signal corresponding to the target row; a digital logic circuit including: a target row logic circuit to generate a pixel control signal based on the operation directing signal; a power switch configured to connect a power supply voltage to the target row logic circuit during a first time and isolate the power supply voltage from the target row logic circuit during a second time, based on the operation directing signal; and an output circuit configured to output a default signal during the second time; and a row driver configured to drive the target row based on the pixel control signal during the first time and drive the target row based on the default signal during the second time.

20 Claims, 18 Drawing Sheets

(56) References Cited

U.S. PATENT DOCUMENTS

2019/0114118 A1     4/2019   Matsunaga
2021/0176417 A1*   6/2021   Xu ...................... H04N 5/3698

* cited by examiner

IMAGE SENSOR DRIVING CIRCUIT INCLUDING POWER SWITCH AND IMAGE SENSOR INCLUDING THE SAME

CROSS-REFERENCE TO THE RELATED APPLICATION

This application claims priority from Korean Patent Application No. 10-2019-0175243, filed on Dec. 26, 2019 in the Korean Intellectual Property Office, the disclosure of which is incorporated by reference herein in its entirety.

BACKGROUND

1. Field

Apparatuses and methods consistent with example embodiments relate to a driving circuit of an image sensor, and more particularly, relate to an image sensor driving circuit including a power switch and an image sensor including the same.

2. Related Art

Various electronic devices, such as a smartphone, a personal computer (PC), a digital camera, and a digital camcorder, are equipped with an image sensor for obtaining and processing an image. The image sensor may include a pixel array for converting an external light into an electrical signal and obtaining an image. The pixel array may include a plurality of pixels arranged two-dimensionally, and the image sensor may include a driving circuit for controlling an operation of the pixel array.

When a driving circuit of the image sensor operates, a leakage current may be generated at the driving circuit. The amount of leakage current increases at the driving circuit due to the following: a reduced scale manufacturing technology applied to the driving circuit, an increase in the number of internal elements of the driving circuit according to high-resolution image acquisition and variously added functions, and an increase in an operating temperature according to a decrease in the size of an electronic device. The increase in the amount of the leakage current of the driver circuit may cause an increase of power consumption of the electronic device and an increase in a temperature of the electronic device, thereby making the quality of an image low. Accordingly, a way to decrease the leakage current of the driving circuit is needed.

SUMMARY

One or more example embodiments provide an image sensor driving circuit including a power switch capable of reducing a leakage current and preventing an increase in a temperature and power consumption and an image sensor including the same.

According to an example embodiment, a driver circuit of an image sensor includes The driver circuit includes a row decoder configured to decode an address directing a target row of a pixel array and generate an operation directing signal corresponding to the target row; a digital logic circuit including: a target row logic circuit configured to generate a pixel control signal corresponding to the target row based on the operation directing signal; a power switch configured to connect a power supply voltage to the target row logic circuit during a first time and isolate the power supply voltage from the target row logic circuit during a second time, based on the operation directing signal; and an output circuit configured to output a default signal during the second time based on the operation directing signal; and a row driver configured to drive the target row of the pixel array based on the pixel control signal during the first time and drive the target row of the pixel array based on the default signal during the second time.

According to an example embodiment, a driver circuit of an image sensor includes a row decoder configured to decode an address and generate an operation directing signal having an enable level during a first time directing an operation of a target row of a pixel array; a latch including: a target row latch configured to detect the operation directing signal of the first time and to generate an operating signal having an enable level during a second time after the first time, based on the operation directing signal of the first time; a power gating control circuit configured to generate a power gating signal based on the operation directing signal; and a first power switch configured to connect a power supply voltage to the target row latch during the first time and the second time based on the power gating signal; and a digital logic circuit including: a target row logic circuit configured to generate a pixel control signal corresponding to the target row based on the operating signal; and a second power switch configured to connect the power supply voltage to the target row logic circuit during the first time and the second time based on the power gating signal.

According to an example embodiment, an image sensor includes a pixel array including a plurality of pixels; a driver circuit connected to rows of the pixel array through row lines, the driver circuit being configured to control a first operation and a second operation of each of the rows; and a converting circuit connected to columns of the pixel array through column lines, the converting circuit being configured to receive an image signal from the pixel array through the column lines and convert the received image signal into a digital image signal, in accordance with the first operation and the second operation of the pixel array. The driver circuit includes: a row decoder configured to decode an address directing a target row of the pixel array, at which the first operation and the second operation are performed, and generate an operation directing signal corresponding to the target row; a digital logic circuit including: a target row logic circuit configured to generate a pixel control signal corresponding to the target row based on the operation directing signal; and a power switch configured to connect a power supply voltage to the target row logic circuit based on the operation directing signal while the target row logic circuit generates the pixel control signal corresponding to the first operation and the second operation; and a row driver configured to control the first operation and the second operation of the target row, based on the pixel control signal.

BRIEF DESCRIPTION OF THE FIGURES

The above and other objects and features will become apparent from the following description of example embodiments with reference to the accompanying drawings in which.

DETAILED DESCRIPTION

The above and other aspects and features will become more apparent by describing in detail example embodiments with reference to the accompanying drawings. It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Figure 1:
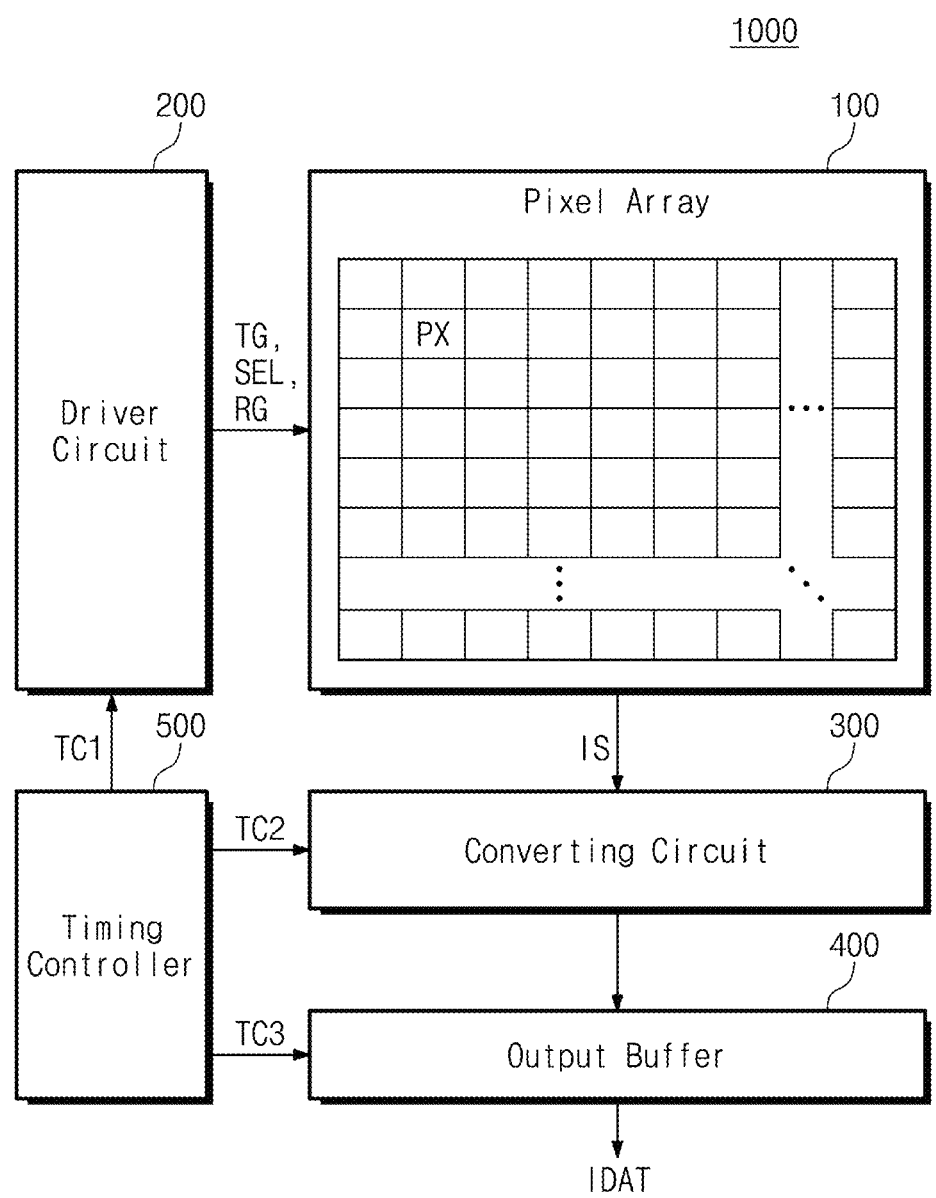
FIG. 1 is a block diagram of an image sensor according to an example embodiment.

FIG. 1 is a block diagram of an image sensor according to an example embodiment. Referring to FIG. 1, an image sensor 1000 may include a pixel array 100, a driver circuit 200, a converting circuit 300, an output buffer 400, and a timing controller 500. The image sensor 1000 may be implemented in various electronic devices such as a digital camera, a smartphone, a tablet PC, and a wearable device. The image sensor 1000 may be implemented with an integrated circuit (IC), a system on chip (SoC), etc.

The pixel array 100 includes a plurality of pixels PX arranged two-dimensionally. Each of the plurality of pixels PX may convert a light signal sensed from the outside into a pixel signal being an electrical signal. For example, the plurality of pixels PX may generate the electrical signal based on an amount of light that is incident on each corresponding pixel PX. The pixel array 100 may generate an image signal IS as an analog signal including pixel signals generated by the plurality of pixels PX. The pixel array 100 may be controlled by pixel control signals provided from the driver circuit 200 and may generate the image signal IS. The image signal IS may be provided to the converting circuit 300 through a plurality of column lines.

The driver circuit 200 may select a row of the pixel array 100 that includes one or more pixels. The pixels included in the selected row may generate pixel signals, which are provided to the converting circuit 300. To this end, the driver circuit 200 may generate the pixel control signals corresponding to the selected row and may provide the pixel control signals to the pixel array 100. The pixel control signals may be provided to the pixel array 100 through row lines. For example, the pixel control signals may include a transfer control signal TG provided to a transfer transistor of each pixel PX, a reset control signal RG provided to a reset transistor of each pixel PX, and a selection signal SEL provided to a selection transistor of each pixel PX. The pixel control signals will be more fully detailed later.

The converting circuit 300 may convert the analog image signal IS into a digital image signal IDAT. The converting circuit 300 may receive pixel signals generated by pixels of the row selected by the driver circuit 200 in parallel through column lines and may convert the received pixel signals into digital signals. The converting circuit 300 may perform various operations for converting an analog signal into a digital signal. For example, the converting circuit 300 may perform correlated double sampling (CDS) for extracting an effective signal component.

The output buffer 400 may store the digital image signal IDAT generated by the converting circuit 300. The output buffer 400 may output the digital image signal IDAT to an image signal processor (ISP).

The timing controller 500 may control overall operations of the image sensor 1000. The timing controller 500 may respectively provide control signals TC1, TC2, and TC3 to the driver circuit 200, the converting circuit 300, and the output buffer 400 and may drive the image sensor 1000. The driver circuit 200 may generate the pixel control signals, based on the first control signal TC1. The converting circuit 300 may convert the image signal IS into the digital image signal IDAT, based on the second control signal TC2. Based on the third control signal TC3, the output buffer 400 may temporarily store the digital image signal IDAT and may output the temporarily stored digital image signal IDAT to the outside.

Figure 2:
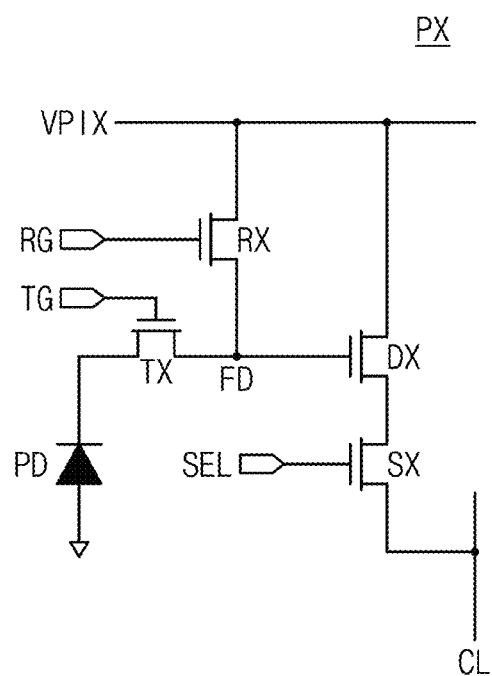
FIG. 2 is a circuit diagram of a pixel according to an example embodiment.

FIG. 2 is a circuit diagram of a pixel according to an example embodiment. For example, the circuit diagram of FIG. 2 may correspond to the pixel of FIG. 1. Referring to FIG. 2, the pixel PX may include a photoelectric conversion element PD, a floating diffusion area FD, a transfer transistor TX, a reset transistor RX, a selection transistor SX, and a driving transistor DX. The structure illustrated in FIG. 2 is an example and other pixel structures may be implemented in the image sensor of FIG. 1. For example, the pixel PX may further include a storage transistor that is connected between the transfer transistor TX and the floating diffusion area FD. In this case, the driver circuit 200 of FIG. 1 may further generate a storage control signal for controlling the storage transistor.

The photoelectric conversion element PD generates and integrates charges depending on the amount of incident light or the intensity of incident light. For example, the photoelectric conversion element PD may be implemented with, but is not limited to, a photo diode that includes InGaAs for sensing a light in an infrared band. For example, the photoelectric conversion element PD may be a photo diode, a photo transistor, a photo gate, a pinned photo diode (PPD), or a combination thereof.

The transfer transistor TX may transfer charges generated and integrated by the photoelectric conversion element PD to the floating diffusion area FD. The transfer transistor TX may be connected between the photoelectric conversion element PD and the floating diffusion area FD. The transfer transistor TX may be turned on or turned off by the transfer control signal TG. The transfer control signal TG may be provided from the driver circuit 200 of FIG. 1. When the transfer transistor TX is turned on, the charges generated and integrated by the photoelectric conversion element PD may be transferred to the floating diffusion area FD. When the transfer transistor TX is turned off, the photoelectric conversion element PD may integrate charges.

The floating diffusion area FD may integrate charges transferred from the photoelectric conversion element PD through the transfer transistor TX. The driving transistor DX may be controlled depending on the amount of charges integrated at the floating diffusion area FD.

The reset transistor RX may reset charges integrated at the floating diffusion area FD. The reset transistor RX may be connected between the floating diffusion area FD and a pixel power supply voltage VPIX. The reset transistor RX may be turned on or turned off by the reset signal RG. The reset signal RG may be provided from the driver circuit 200 of FIG. 1. When the reset transistor RX is turned on, the pixel power supply voltage VPIX may be transferred to the floating diffusion area FD. In this case, the charges integrated at the floating diffusion area FD may be discharged, and thus, the floating diffusion area FD may be reset.

The driving transistor DX may be a source follower buffer amplifier that generates a source-drain current in proportion to the amount of charges of the floating diffusion area FD, which are input to a gate terminal of the driving transistor DX. The driving transistor DX may amplify a potential change of the floating diffusion area FD and may output the amplified signal to a column line CL through the selection transistor SX. The signal thus output may be the pixel signal.

The selection transistor SX is used to select the pixel PX to be read in units of a row. The selection transistor SX may be turned on or turned off by the selection signal SEL. The selection signal SEL may be provided from the driver circuit 200 of FIG. 1. When the selection transistor SX is turned on, the pixel signal output from the driving transistor DX may be output to a column line CL.

Figure 3:
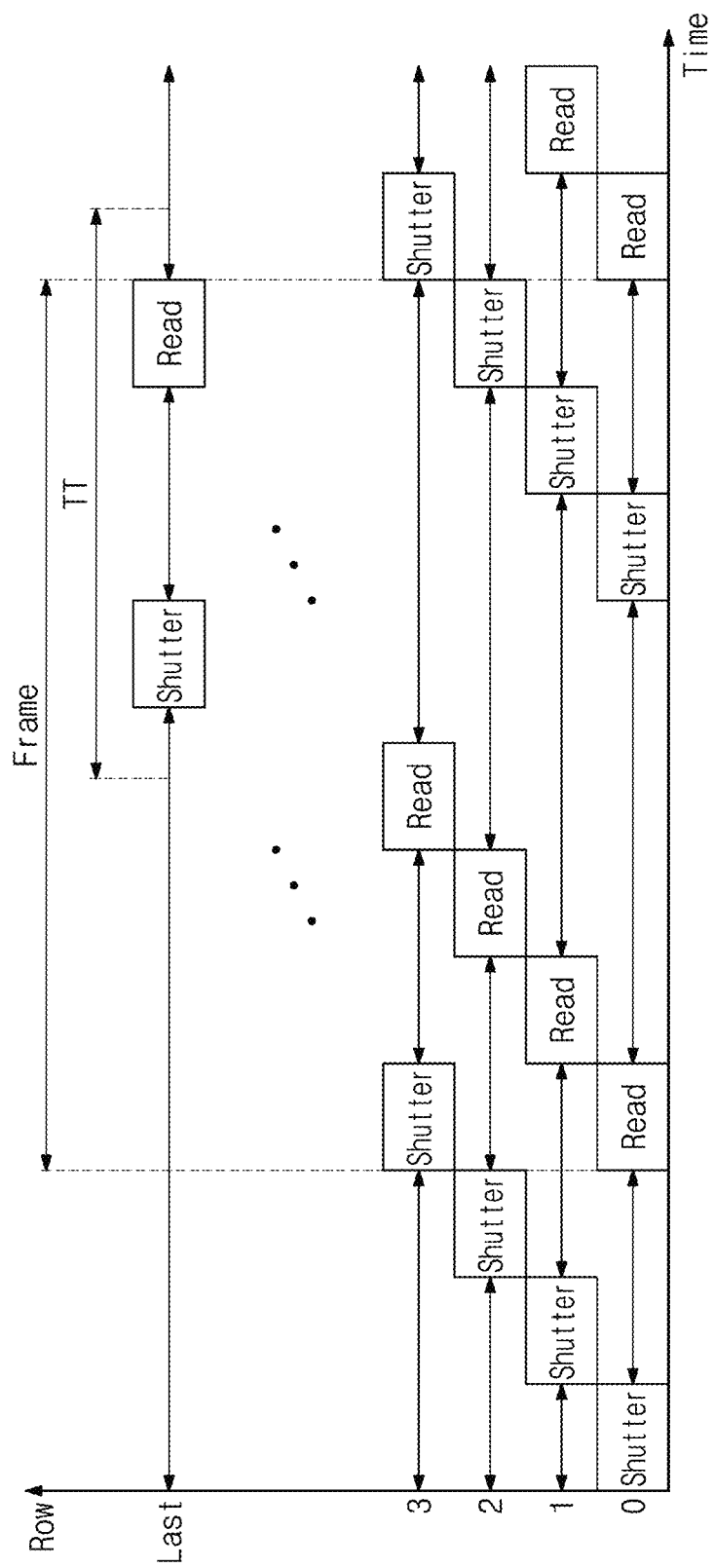
FIG. 3 is a timing diagram for describing an operation of an image sensor according to an example embodiment.

FIG. 3 is a timing diagram for describing an operation of an image sensor according to an example embodiment. For example, the timing diagram of FIG. 3 may describe an operation of the image sensor of FIG. 1. In FIG. 3, a horizontal axis indicates a time, and a vertical axis indicates rows of the pixel array 100. The pixel array 100 may operate in units of a row under control of the driver circuit 200. For convenience of description, FIG. 3 will be described with reference to reference numerals/marks of FIG. 1.

Shutter times progress sequentially from a 0-th row to the last row. The shutter time may be an operating time of the driver circuit 200 for resetting charges integrated at the photoelectric conversion element PD of FIG. 2. The shutter time may be determined depending on an operating manner of the driver circuit 200, and how to determine the shutter time will be described later. Through the shutter time, charges generated and integrated at the pixels PX of each row are removed. After the shutter time, the photoelectric conversion element PD of each of the pixels PX may newly generate and integrate charges. Charges may be integrated until a read time.

After charges are generated and integrated at the respective pixels PX, the read times progress sequentially from the 0-th row to the last row. The read time may be an operating time of the driver circuit 200 for generating and reading a pixel signal based on the integrated charges. The read time may be determined depending on an operating manner of the driver circuit 200, and how to determine the read time will be described later. Through the read time, charges integrated at the photoelectric conversion element PD are transferred to the floating diffusion area FD, and a pixel signal is generated based on the charges integrated at the floating diffusion area FD. The pixel signal may be output to the converting circuit 300 during the read time. Read operations are sequentially performed from the 0-th row to the last row during one frame time.

According to a rolling shutter manner of FIG. 3, charge reset operations may be performed sequentially on respective rows of the pixel array 100. However, example embodiments are not limited thereto. For example, a global shutter manner, in which a charge reset operation is performed on all rows of the pixel array 100 at the same shutter time (or simultaneously during the shutter time), may be used. Also, in addition to the shutter time and the read time, an additional operating time may be provided depending on a circuit structure of the pixel PX. Power gating of a driver circuit of an example embodiment to be described later may be applied to the global shutter manner without limitation to the rolling shutter manner of FIG. 3 and may be applied to the additional operating time.

Figure 4:
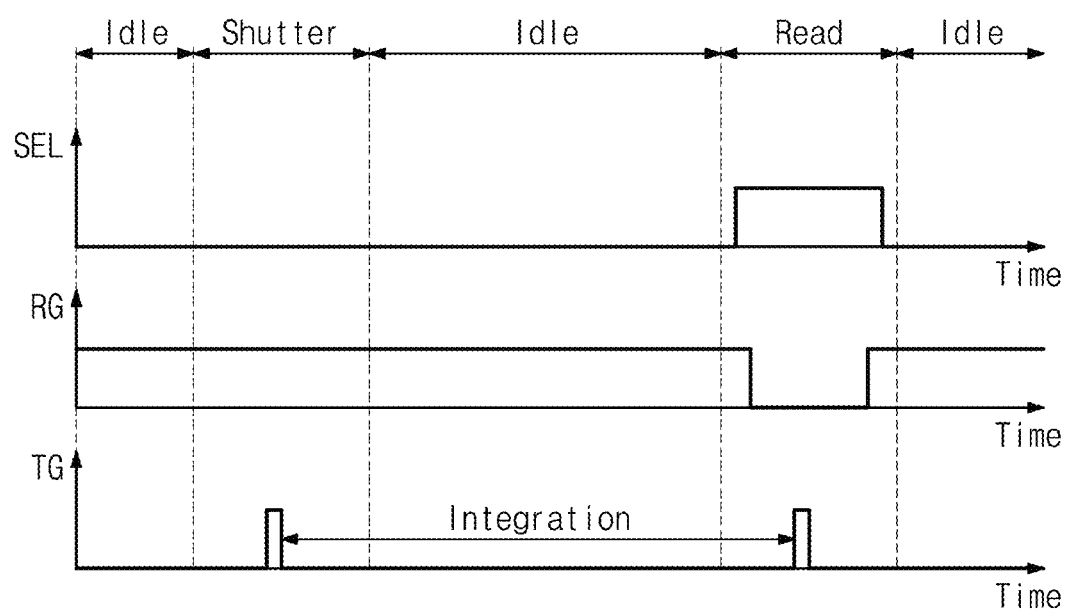
FIG. 4 is a timing diagram of a shutter time and a read time according to an example embodiment.

FIG. 4 is a timing diagram for implementing a shutter time and a read time according to an example embodiment. The timing diagram of FIG. 4 is a timing diagram of a pixel control signal in a time TT of FIG. 3. In FIG. 4, a horizontal axis indicates a time, and a vertical axis indicates levels of the transfer control signal TG, the reset control signal RG, and the selection signal SEL included in the pixel control signal.

The transfer control signal TG, the reset control signal RG, and the selection signal SEL are generated by the driver circuit 200 of FIG. 1. As described with reference to FIGS. 1 and 2, the transfer control signal TG is provided to the transfer transistor TX of FIG. 2, the reset control signal RG is provided to the reset transistor RX of FIG. 2, and the selection signal SEL is provided to the selection transistor SX of FIG. 2. It is assumed that a pixel control signal of a high level turns on a transistor.

During at least a portion of the shutter time, the transfer control signal TG turns on the transfer transistor TX. During the shutter time, because the reset control signal RG turns on the reset transistor RX, integrated charges may be discharged from the photoelectric conversion element PD through the transfer transistor TX and the reset transistor RX. After the transfer transistor TX is turned off, the photoelectric conversion element PD may sense a light and may generate and integrate charges. Charges may be integrated until an integration time.

During at least a portion of the read time, the transfer control signal TG turns on the transfer transistor TX. During the at least a portion of the read time, because the reset control signal RG turns off the reset transistor RX, integrated charges may be transferred from the photoelectric conversion element PD to the floating diffusion area FD through the transfer transistor TX. As such, a pixel signal may be generated. During the at least a portion of the read time, because the selection signal SEL turns on the selection transistor SX, the pixel signal may be output to the converting circuit 300 through a column line.

In a driving time for generating an image signal, the remaining time of the driving time other than the shutter time and the read time may be referred to as an idle time. During the idle time, pixel control signals may maintain a default level. For example, a low level may be a default level in the case of the transfer control signal TG and the selection signal SEL; a high level may be a default level in the case of the reset control signal RG. The idle time may be determined depending on an operating manner of the driver circuit 200, and how to determine the idle time will be described later. To reduce a leakage current of the driver circuit 200, during the idle time when a default level is maintained, the supplying of a power to some components of the driver circuit 200 may be blocked.

Figure 5:
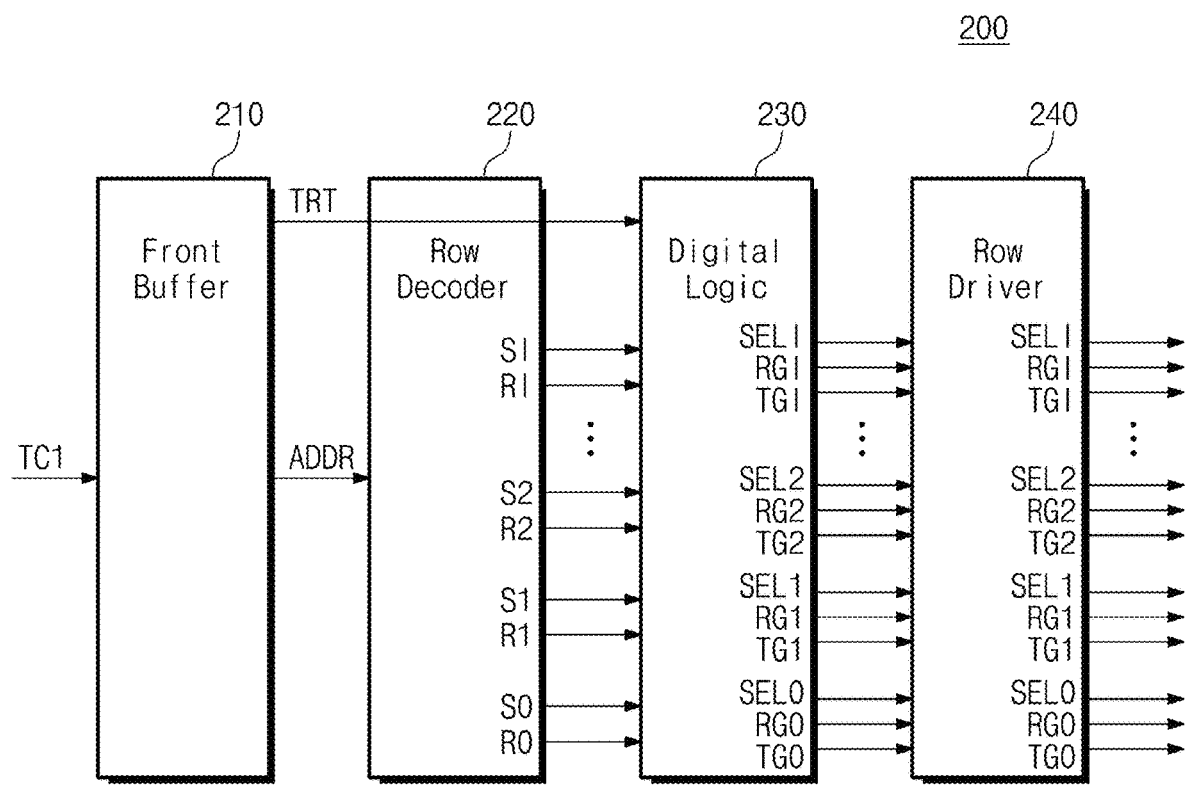
FIG. 5 is a block diagram of a driver circuit according to an example embodiment.

FIG. 5 is a block diagram of a driver circuit according to an example embodiment. For example, the driver circuit of FIG. 5 may correspond to the driver circuit of FIG. 1. Referring to FIG. 5, the driver circuit 200 may include a front buffer 210, a row decoder 220, a digital logic circuit 230, and a row driver 240. The driver circuit 200 may operate based on the control signal TC1 of the timing controller 500.

The front buffer 210 may receive and temporarily store signals for generating pixel control signals. For example, the signals for generating the pixel control signals may include an address ADDR and operating information TRT. The front buffer 210 may output the stored address ADDR to the row decoder 220 and may output the stored operating information TRT to the digital logic circuit 230.

The address ADDR may indicate a row of the pixel array 100, on which a specific operation is performed. For example, the address ADDR may indicate a row of the pixel array 100, on which a shutter operation is performed. For example, the address ADDR may indicate a row of the pixel array 100, on which a read operation is performed. The address ADDR may be generated within the driver circuit 200. However, example embodiments are not limited thereto. For example, the address ADDR may be included in the control signal TC1 or may be generated by an external device of the image sensor 1000.

The operating information TRT may include information about a pattern of pixel control signals for performing the specific operation. For example, the operating information TRT may include a pattern of the transfer control signal TG, the reset control signal RG, and the selection signal SEL that are used in the shutter time or the read time. The operating information TRT may be generated within the driver circuit 200. However, example embodiments are not limited thereto. For example, the operating information TRT may be included in the control signal TC1 or may be generated by an external device of the image sensor 1000.

The row decoder 220 may decode the address ADDR and may generate operation directing signals directing the specific operation of rows. When the address ADDR directs a target row, an operation directing signal of the target row may have an enable level. For example, an idle time and a driving time of the specific operation may be distinguished by the operation directing signal. The operation directing signal described in FIG. 5 may have an enable level within a time range in which the specific operation is performed. However, the operation directing signal may be a signal that is latched to generate an operating signal indicating the time range in which the specific operation is performed, which will be described with reference to FIG. 11.

For example, the operation directing signal may include shutter signals S0, S1, S2, and SI of the 0-th to I-th rows, each of which indicates a time range in which the specific operation is performed. For example, the operation directing signal may include read signals R0, R1, R2, and RI of the 0-th to I-th rows, each of which indicates a time range in which a read operation is performed. Although not illustrated, in the case where another operation for the pixel array 100 is present, the row decoder 220 may decode the address ADDR and may further generate operation directing signals indicating a time range in which the another operation is performed.

Times that are not directed by operation directing signals as specific operations are performed may be referred to as an idle time. As described with reference to FIG. 3, times in which a specific operation is performed on respective rows may be different, and thus, idle times respectively corresponding to the rows may be different.

The digital logic circuit 230 may generate a pixel control signal based on an operation directing signal and the operating information TRT. For example, the pixel control signal may include transfer control signals TG0, TG1, TG2, and TGI, reset control signals RG0, RG1, RG2, RGI, and selection signals SEL0, SEL1, SEL2, and SELI that are applied to a plurality of rows. The digital logic circuit 230 may apply various patterns of transistor control signals included in the operating information TRT to an execution time of a specific operation controlled by the operation directing signal and may generate pixel control signals.

The digital logic circuit 230 may include row logic circuits respectively corresponding to the plurality of rows. Each of the row logic circuits may generate a pixel control signal corresponding to the corresponding row. Each of the row logic circuits may not be supplied with a power supply voltage during an idle time. To this end, power switches respectively corresponding to the row logic circuits may be provided. A power switch may isolate a power supply voltage from a row logic circuit during an idle time based on an operation directing signal and may connect the power supply voltage to the row logic circuit during a time when a specific operation is performed.

More leakage current may flow at the digital logic circuit 230 compared to any other components of the driver circuit 200, such as the front buffer 210, the row decoder 220, and the row driver 240. Unlike the front buffer 210, the row decoder 220, and the row driver 240, the digital logic circuit 230 may be composed of digital elements, and most of the leakage current may occur at the digital elements. The number of elements of the digital logic circuit 230 may be significantly higher when compared to the front buffer 210, the row decoder 220, and the row driver 240. For example, on a row basis, the number of elements included in the front buffer 210 may be minimal, and the row decoder 220 and the row driver 240 may include approximately 20 elements. However, on a row basis, the number of elements included in the digital logic circuit 230 may exceed 300. Accordingly, even though only the digital logic circuit 230 is powered off during the idle time, the leakage current of the driver circuit 200 may markedly decrease.

The row driver 240 drives each of the rows of the pixel array 100 based on pixel control signals generated by the digital logic circuit 230. For example, the row driver 240 may adjust levels of pixel control signals so as to be suitable for characteristics of transistors of the pixel array 100 and may output the pixel control signals of the adjusted levels to row lines.

Figure 6:
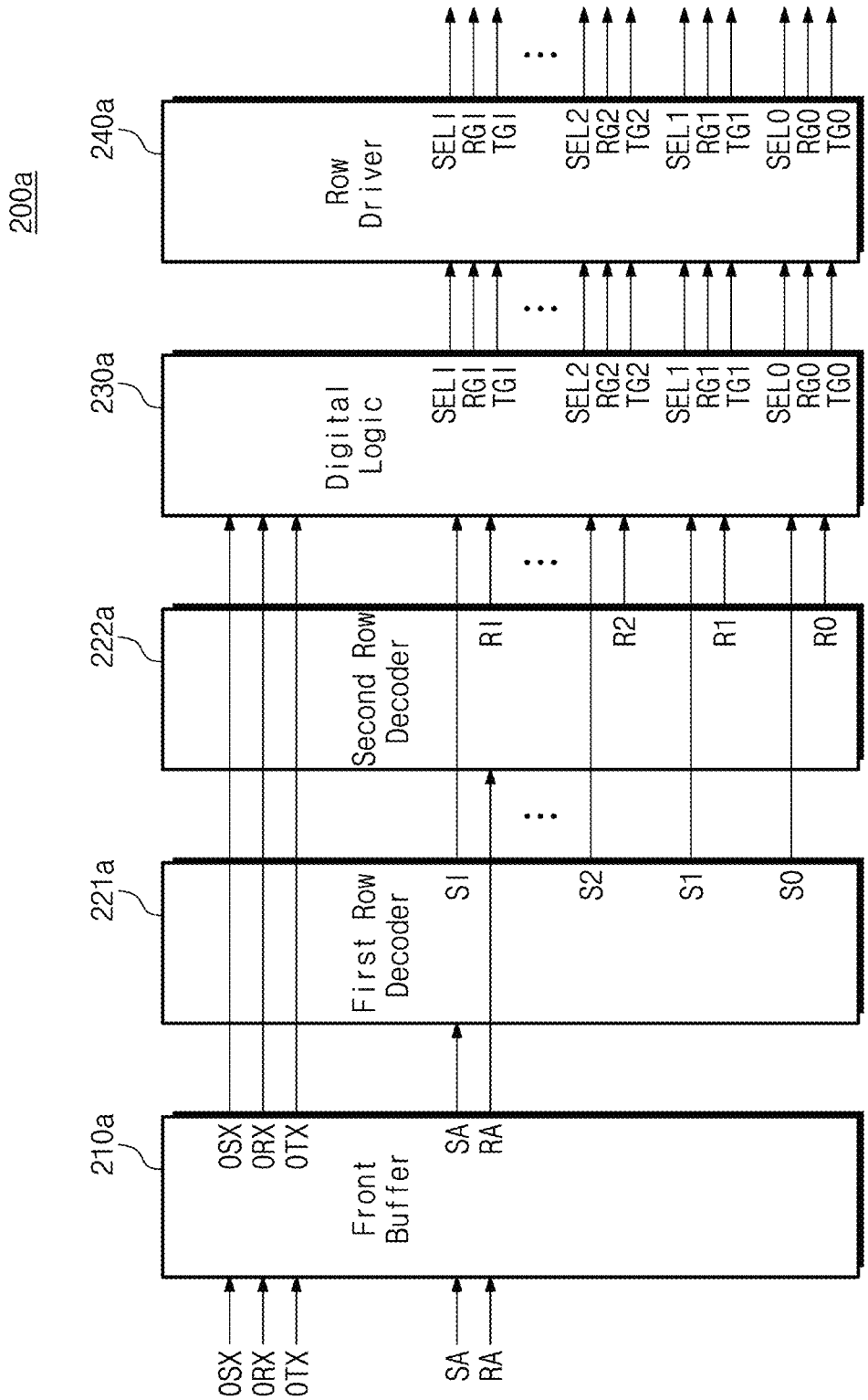
FIG. 6 is a block diagram of a driver circuit according to an example embodiment.

FIG. 6 is a block diagram of a driver circuit according to an example embodiment. For example, the block diagram of FIG. 6 may correspond to the driver circuit of FIG. 1. Referring to FIG. 6, a driver circuit 200a may include a front buffer 210a, a first row decoder 221a, a second row decoder 222a, a digital logic circuit 230a, and a row driver 240a. With regard to components that are identical to those of FIG. 5, additional description will be omitted to avoid redundancy. A description will be given under the assumption that the driver circuit 200a operates to drive the shutter operation and the read operation described above.

The front buffer 210a may receive and temporarily store a shutter address SA, a read address RA, a transfer transistor operating information OTX, a reset transistor operating information ORX, and a selection transistor operating information OSX. It may be understood that the shutter address SA and the read address RA are included in the address ADDR of FIG. 5 and the transfer transistor operating information OTX, the reset transistor operating information ORX, and the selection transistor operating information OSX are included in the operating information TRT of FIG. 5.

The first row decoder 221a may decode the shutter address SA to generate the shutter signals S0, S1, S2, and SI. The second row decoder 222a may decode the read address RA to generate the read signals R0, R1, R2, and RI. In the case where an additional operation different from the shutter operation and the read operation is required for the pixel array 100, an additional row decoder may be further included in the driver circuit 200a. In this case, an address for the additional operation may be further provided to the driver circuit 200a.

The digital logic circuit 230a may apply the transfer transistor operating information OTX, the reset transistor operating information ORX, and the selection transistor operating information OSX to a shutter time and a read time indicated by the shutter signals S0, S1, S2, and SI and the read signals R0, R1, R2, and RI. The transfer control signals TG0, TG1, TG2, and TGI, the reset control signals RG0, RG1, RG2, RGI, and the selection signals SEL0, SEL1, SEL2, and SELI may be generated as a result of the application. During an idle time determined based on the shutter signals S0, S1, S2, and SI and the read signals R0, R1, R2, and RI, a power may not be provided to the digital logic circuit 230a. The row driver 240a drives each of the rows of the pixel array 100 based on pixel control signals generated by the digital logic circuit 230a.

Figure 7:
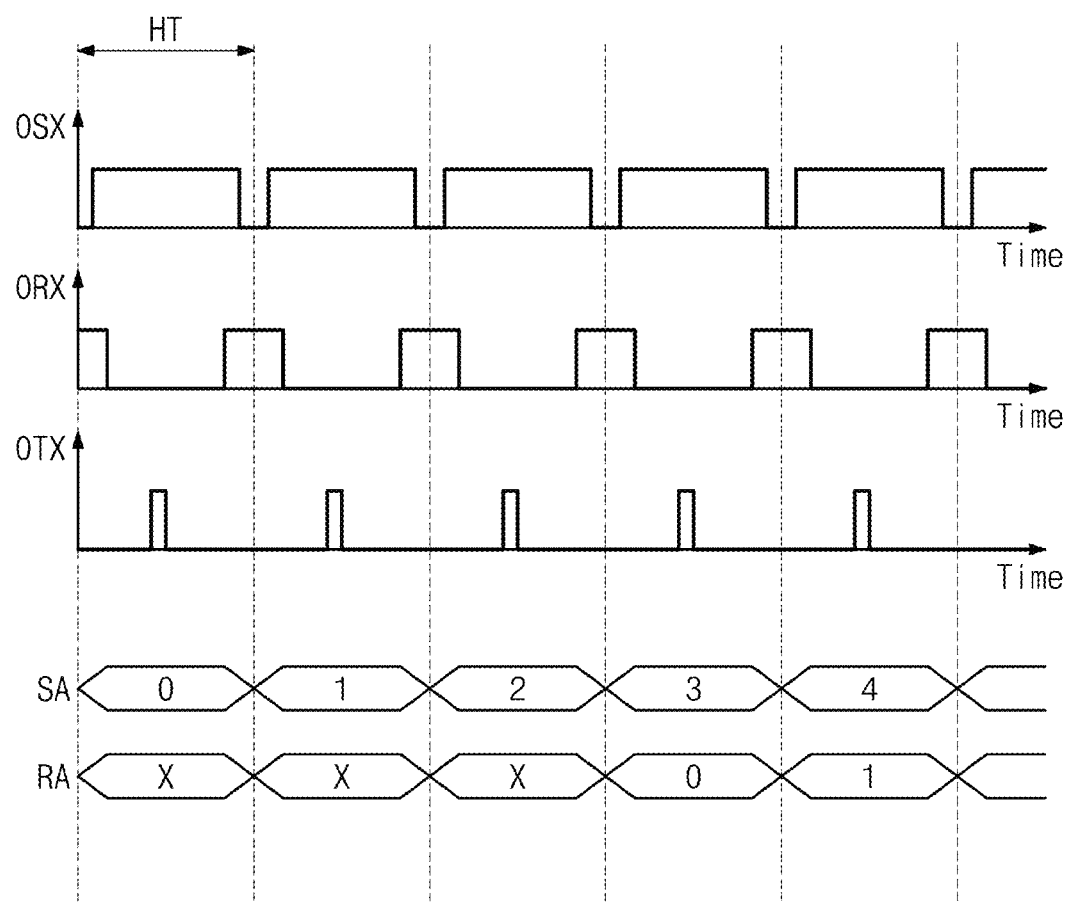
FIG. 7 is a timing diagram of signals input to a front buffer according to an example embodiment.

FIG. 7 is a timing diagram of signals input to a front buffer according to an example embodiment. For example the timing diagram of FIG. 7 may indicate signals input to the front buffer of FIG. 6. FIG. 7 shows the shutter address SA, the read address RA, the transfer transistor operating information OTX, the reset transistor operating information ORX, and the selection transistor operating information OSX over time. The input signals of FIG. 7 may be provided to perform the operation of FIG. 3.

The shutter address SA sequentially directs rows where a shutter operation is performed. The shutter address SA directs a row where a shutter operation is performed, in units of a horizontal time HT. As illustrated in FIG. 3, the shutter address SA may sequentially direct rows from the 0-th row.

The read address RA sequentially directs rows where a read operation is performed. The read address RA directs a row where a read operation is performed, in units of a horizontal time HT. As illustrated in FIG. 3, the read address RA may direct the 0-th row during the horizontal time HT when the shutter address SA directs the third row. The read address RA may sequentially direct rows from the 0-th row.

The transfer transistor operating information OTX, the reset transistor operating information ORX, and the selection transistor operating information OSX may have waveforms that are repeated at a period of the horizontal time HT. This repeated pattern corresponds to a pattern of the transfer control signal TG, the reset control signal RG, and the selection signal SEL in the shutter time or the read time of FIG. 4. The pattern of the transfer transistor operating information OTX, the reset transistor operating information ORX, and the selection transistor operating information OSX may be used to generate pixel control signals in the shutter time or the read time.

Figure 8:
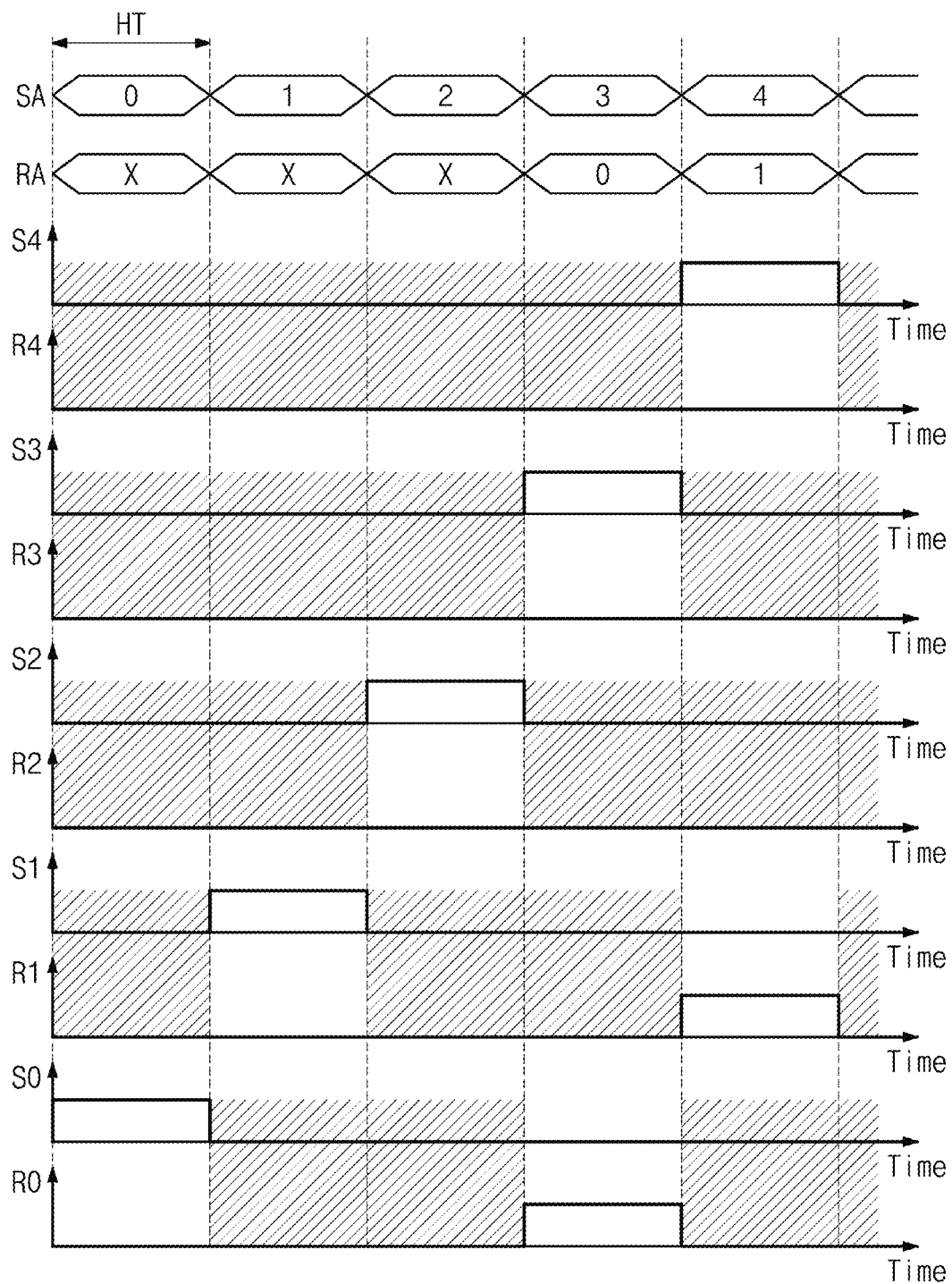
FIG. 8 is a timing diagram of signals generated by first and second row decoders according to an example embodiment.

FIG. 8 is a timing diagram of signals generated by first and second row decoders according to an example embodiment. For example, the timing diagram of FIG. 8 may indicate signals generated by the first and second row decoders of FIG. 6. FIG. 8 shows the shutter signals S0, S1, S2, S3, and S4 and the read signals R0, R1, R2, R3, and R4 over time. The first row decoder 221a may decode the shutter address SA to generate the shutter signals S0, S1, S2, S3, and S4, and the second row decoder 222a may decode the read address RA to generate the read signals R0, R1, R2, R3, and R4.

Referring to FIG. 8, when the shutter address SA directs a target row, a shutter signal corresponding to the target row may have the enable level (or a high level). When the read address RA directs the target row, a read signal corresponding to the target row may have the enable level. Because the shutter address SA and the read address RA direct one row during the horizontal time HT, a time interval in which each of the shutter signals S0, S1, S2, S3, and S4 and the read signals R0, R1, R2, R3, and R4 has the enable level may be equal to a time interval of the horizontal time HT.

A time when each of the shutter signals S0, S1, S2, S3, and S4 has the enable level may be referred to as the shutter time. A time when each of the read signals R0, R1, R2, R3, and R4 has the enable level may be referred to as the read time. The shutter time and the read time may be determined in units of the horizontal time HT. The shutter time and the read time may be differently determined for each row.

In one embodiment, as described above, the power switch PS may be turned on based on the power gating signal PG of the enable level and be turned off based on the power gating signal PG of the disable level. Since the power gating signal PG may have the enable level during the shutter time and the read time, the power switch PS may be configured to maintain its current state during the horizontal time HT.

A time corresponding to a shading portion of FIG. 8 indicates an idle time of each row. In the case where operations for driving the pixel array 100 include only the shutter and read operations, on a row basis, the idle time may correspond to the remaining time of the driving time of the image sensor 1000 other than the shutter time and the read time. However, in the case where an additional operation of the pixel array 100 is performed on a row basis, the idle time may correspond to the remaining time of the driving time of the image sensor 1000 other than the shutter time and the read time and a time for the additional operation. Like the shutter time and the read time, idle times of rows may be determined to be different from each other. Accordingly, the row logic circuits included in the digital logic circuit 230a may not be supplied with the power supply voltage at different times. In other words, the row logic circuits included in the digital logic circuit 230a may be isolated from the power supply voltage at different times. For example, a row logic circuit corresponding to a first row may be isolated from the power supply voltage while a row logic circuit corresponding to a second row may be connected to the power supply voltage.

Figure 9:
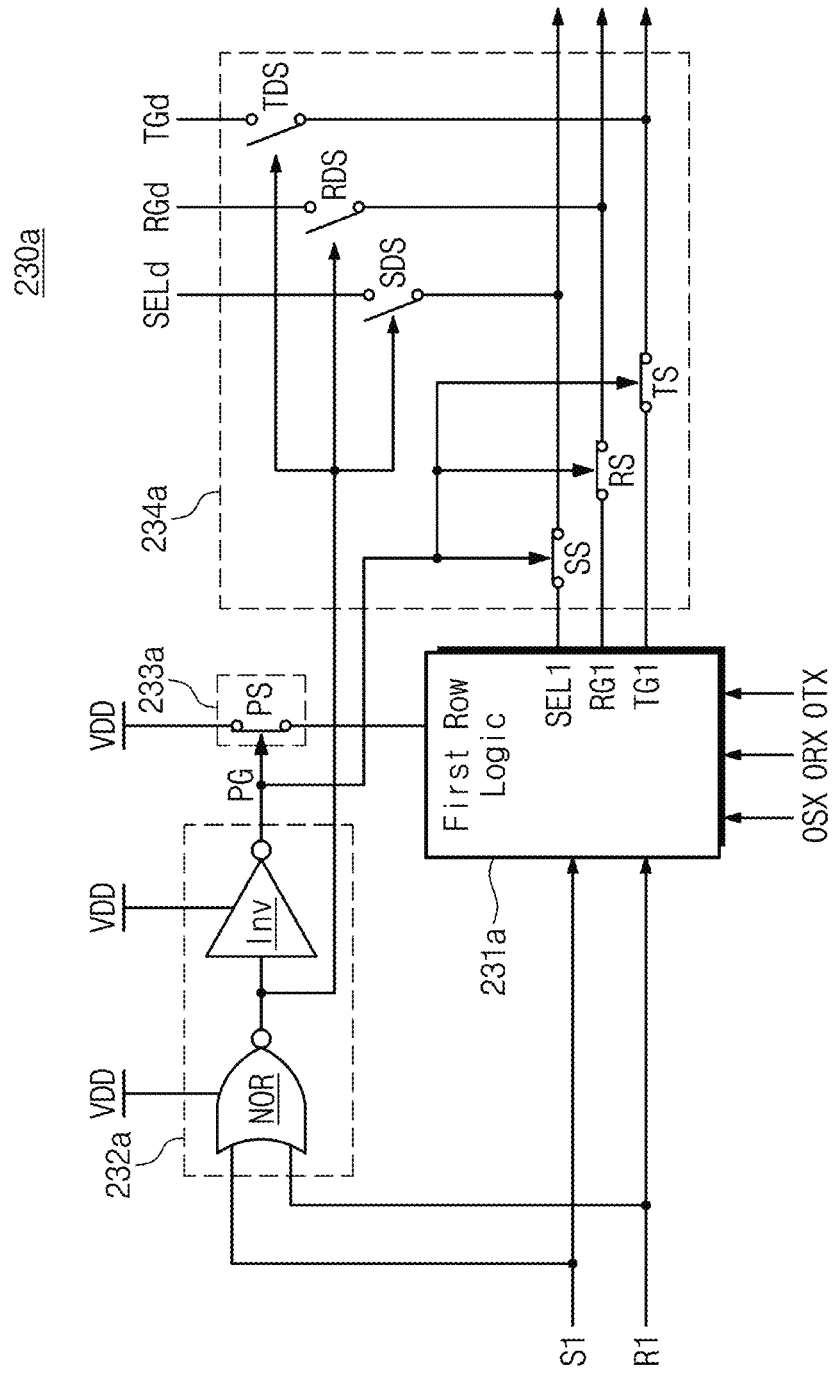
FIG. 9 is a circuit diagram of a digital logic circuit according to an example embodiment.

FIG. 9 is a circuit diagram of a digital logic circuit according to an example embodiment. For example, the circuit diagram of FIG. 9 may correspond to the digital logic circuit of FIG. 6. The digital logic circuit 230a of FIG. 9 may be understood as a structure that generates pixel control signals corresponding to a target row (e.g., a first row).

Because the digital logic circuit 230a generates pixel control signals corresponding to a plurality of rows, a plurality of digital logic circuits 230a may be provided such that a digital logic circuit 230a is provided for each of the rows. Referring to FIG. 9, the digital logic circuit 230a may include a row logic circuit (or a first row logic circuit) 231a, a power gating control circuit 232a, a power gating circuit 233a, and an output circuit 234a.

The row logic circuit 231a may apply operating information corresponding to a shutter time and a read time respectively indicated by the shutter signal S1 and the read signal R1, and may generate pixel control signals. The operating information may include the transfer transistor operating information OTX, the reset transistor operating information ORX, and the selection transistor operating information OSX. The pixel control signals may include the transfer control signal TG, the reset control signal RG, and the selection signal SEL.

The power gating control circuit 232a may generate a power gating signal PG based on the shutter signal S1 and the read signal R1. The power gating control circuit 232a may include a NOR gate NOR and an inverter Inv. In this case, the power gating signal PG may be identical to a result of performing an OR operation on the shutter signal S1 and the read signal R1. That is, the power gating signal PG may have the enable level during the shutter time and the read time and may have a disable level during the idle time.

The power gating circuit 233a may transfer a power supply voltage VDD to the row logic circuit 231a based on the power gating signal PG. The power gating circuit 233a may include a power switch PS that is turned on based on the power gating signal PG of the enable level and is turned off based on the power gating signal PG of the disable level. The power switch PS may transfer the power supply voltage VDD to the row logic circuit 231a during the shutter time and the read time. The power switch PS may not transfer the power supply voltage VDD to the row logic circuit 231a during the idle time.

The output circuit 234a may transfer the pixel control signals to the row driver 240a based on the power gating signal PG. To this end, the output circuit 234a may include first, second, and third output switches SS, RS, and TS. The first to third output switches SS, RS, and TS may operate based on the power gating signal PG. During the shutter time and the read time, the row logic circuit 231a may generate the selection signal SEL1, the reset control signal RG1, and the transfer control signal TG1. The selection signal SEL1 may be output through the first output switch SS, the reset control signal RG1 may be output through the second output switch RS, and the transfer control signal TG1 may be output through the third output switch TS.

During the idle time, because the power supply voltage VDD is not supplied to the row logic circuit 231a, the row logic circuit 231a does not generate the pixel control signals. To transfer signals corresponding to levels of pixel control signals to the row driver 240a, the output circuit 234a may further include first, second, and third default switches SDS, RDS, and TDS. The first, second, and third default switches SDS, RDS, and TDS may operate based on an inverted power gating signal.

During the idle time, the first, second, and third default switches SDS, RDS, and TDS may transfer default signals to the row driver 240a. The default signals may include a default signal SELd having a default level of the selection signal SEL1, a default signal RGd having a default level of the reset control signal RG1, and a default signal TGd having a default level of the transfer control signal TG1.

Even though the power supply voltage VDD is not supplied to the row logic circuit 231a for reducing a leakage current, the driver circuit 200 may stably drive the pixel array 100 by using the default signals during the idle time.

Figure 10:
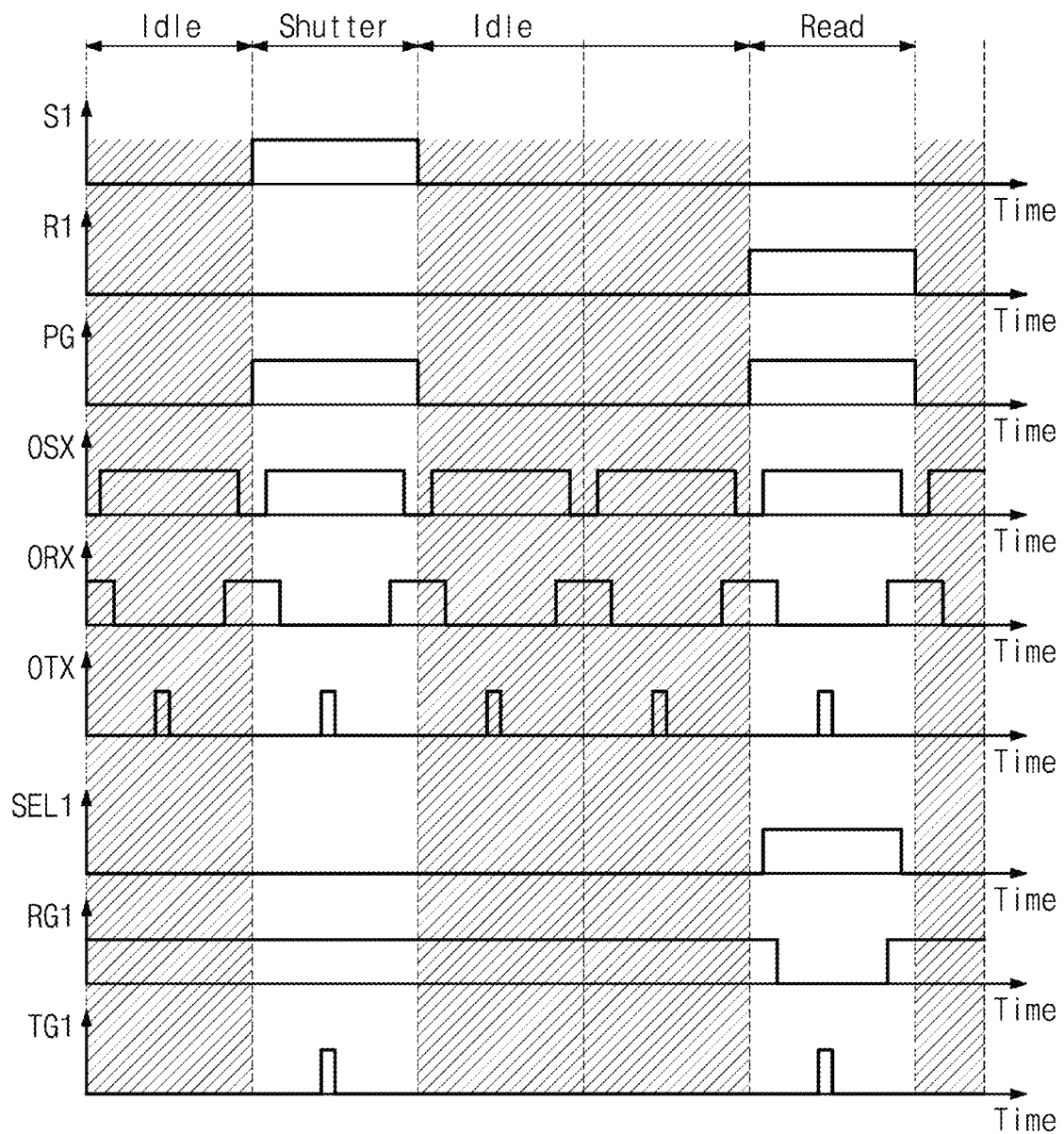
FIG. 10 is a timing diagram of digital logic circuit signals according to an example embodiment.

FIG. 10 is a timing diagram of signals input to a digital logic circuit according to an example embodiment. For example the timing diagram of FIG. 10 may indicate signals input to or generated by the digital logic circuit of FIG. 6. FIG. 10 shows operation directing signals, the power gating signal PG, operating information, and pixel control signals over time. For convenience of description, signals for generating pixel control signals corresponding to a target row (e.g., a first row) are illustrated. Further, for convenience of description, only the shutter operation and the read operation are illustrated herein. Although an additional operation other than the shutter operation and the read operation is not illustrated, example embodiments are not limited thereto.

The power gating signal PG is generated based on the shutter signal S1 and the read signal R1. The power gating signal PG may be generated by performing an OR operation on the shutter signal S1 and the read signal R1. That is, the power gating signal PG may have the enable level during the shutter time and the read time, and may have the disable level during the idle time.

During the shutter time, the row logic circuit 231a may generate the transfer control signal TG1 based on the transfer transistor operating information OTX. During the read time, the row logic circuit 231a may generate the transfer control signal TG1, the reset control signal RG1, and the selection signal SEL1 based on the transfer transistor operating information OTX, the reset transistor operating information ORX, and the selection transistor operating information OSX. That is, a pixel control signal corresponding to a specific operation may be generated by using operating information that is repeated on a horizontal-time (HT) basis.

During the idle time, a power is not provided to the row logic circuit 231a based on the power gating signal PG. Accordingly, the row logic circuit 231a may not output pixel control signals of any level. However, the output circuit 234a may provide default levels of the pixel control signals to the row driver 240a such that the pixel control signals are maintained at the default levels during the idle time.

Figure 11:
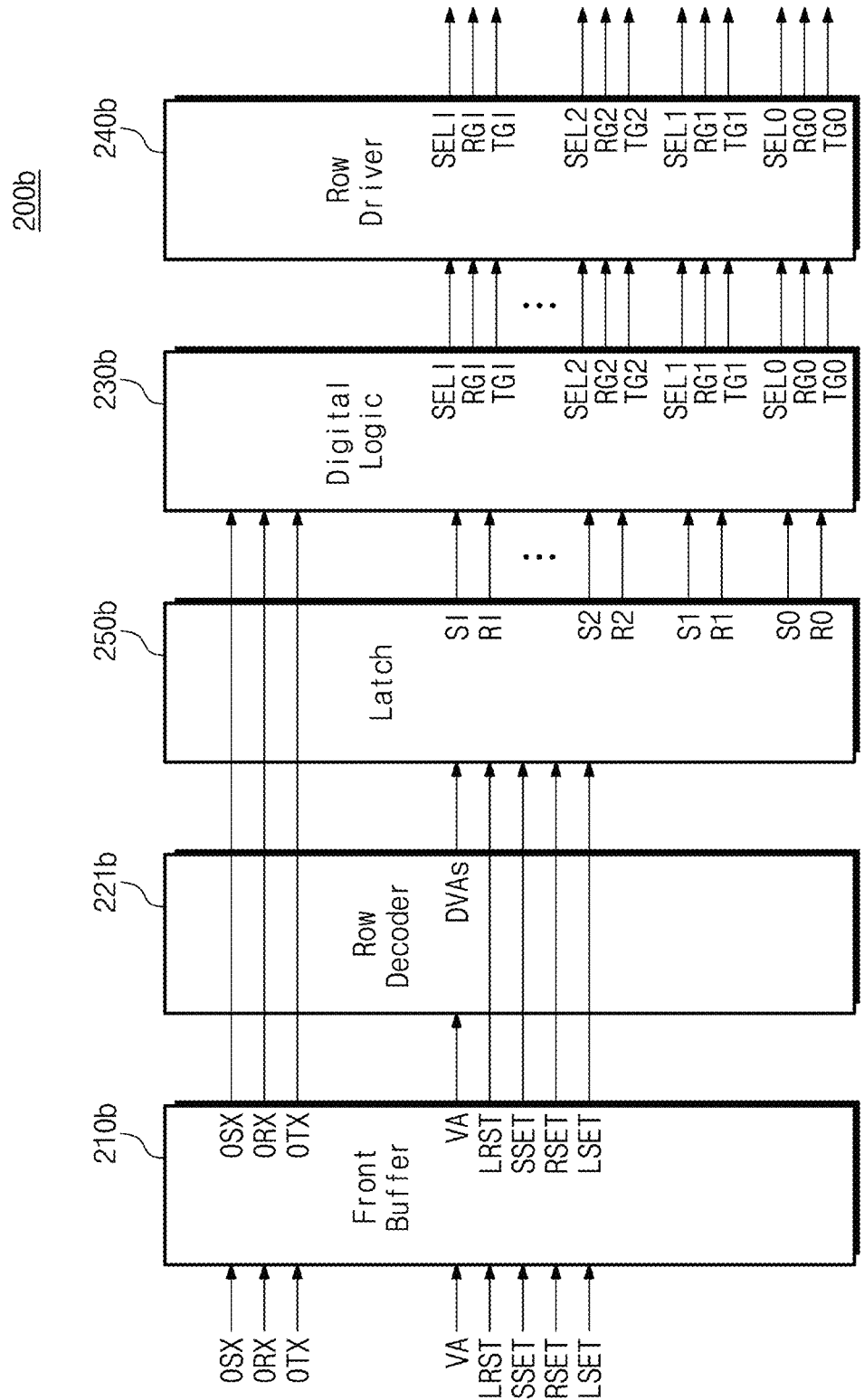
FIG. 11 is a block diagram of a driver circuit according to an example embodiment.

FIG. 11 is a block diagram of a driver circuit according to an example embodiment. For example, the block diagram of FIG. 11 may correspond to the driver circuit of FIG. 1. Referring to FIG. 11, a driver circuit 200b includes a front buffer 210b, a row decoder 221b, a digital logic circuit 230b, a row driver 240b, and a latch 250b. Compared to the driver circuit 200a of FIG. 6, the driver circuit 200b of FIG. 11 may not require an additional row decoder depending on an additional operation of the pixel array 100. Descriptions that are identical to the descriptions given with reference to the driver circuit 200 and 200a of FIGS. 5 and 6 will be omitted to avoid redundancy. A description will be given under the assumption that the driver circuit 200b operates to drive the shutter operation and the read operation described above.

The front buffer 210b may receive and temporarily store an address VA, the transfer transistor operating information OTX, the reset transistor operating information ORX, the selection transistor operating information OSX, and latch information. The latch information includes a latch set signal LSET, a shutter set signal S SET, a read set signal RSET, and a latch reset signal LRST and is used for an operation of the latch 250b. The latch information will be more fully detailed later.

The address VA may direct a row of the pixel array 100, at which the shutter operation is performed, and a row of the pixel array 100, at which the read operation is performed. Unlike the shutter address SA and the read address RA described above, the address VA may direct both a row targeted for the shutter operation and a row targeted for the read operation in a time-division manner.

The row decoder 221b may decode the address VA and may generate operation directing signals DVAs directing the shutter operation and the read operation of each of rows. For example, an operation directing signal corresponding to the first row may direct a start of the shutter operation of the first row and a start of the read operation of the first row. Because the address VA directs all rows targeted for (or performing) the shutter operation and the read operation during one horizontal time, a timing of the address VA to direct a start of the shutter operation or the read operation may be smaller than a horizontal time. In other words, a time when the address VA directs the start of the shutter operation and a time when the address VA directs the start of the read operation may both be within the one horizontal time.

The latch 250b may generate the shutter signals S0, S1, S2, and SI and the read signals R0, R1, R2, and RI based on the operation directing signals DVAs. The latch 250b may detect the operation directing signals DVAs directing the shutter operation by using the shutter set signal SSET. The latch 250b may detect the operation directing signals DVAs directing the read operation by using the read set signal RSET. After detecting the operation directing signals DVAs directing the shutter operation, the latch 250b may change a level of a shutter signal to the enable level by using the latch set signal LSET. After detecting the operation directing signals DVAs directing the read operation, the latch 250b may change a level of a read signal to the enable level by using the latch set signal LSET. The shutter signals S0, S1, S2, and SI and the read signals R0, R1, R2, and RI may have the enable level during a time interval of the horizontal time.

The digital logic circuit 230b may apply the transfer transistor operating information OTX, the reset transistor operating information ORX, and the selection transistor operating information OSX to the shutter signals S0, S1, S2, and SI and the read signals R0, R1, R2, and RI. The transfer control signals TG0, TG1, TG2, and TGI, the reset control signals RG0, RG1, RG2, RGI, and the selection signals SEL0, SEL1, SEL2, and SELI may be generated as a result of the application. The row driver 240b drives each of the rows of the pixel array 100 based on pixel control signals generated by the digital logic circuit 230b.

During the idle time, a power may not be provided to the latch 250b and the digital logic circuit 230b. The idle time may be the remaining time other than a driving time (i.e., the shutter time and the read time) of the driver circuit 200 for the shutter operation and the read operation. The shutter time for the shutter operation may be started by the operation directing signals DVAs and may be ended when the shutter signals S0, S1, S2, and SI have the disable level. The read time for the read operation may be started by the operation directing signals DVAs and may be ended when the read signals R0, R1, R2, and RI have the disable level. A signal for distinguishing the idle time from the shutter and read times may be generated by the latch 250b.

Figure 12:
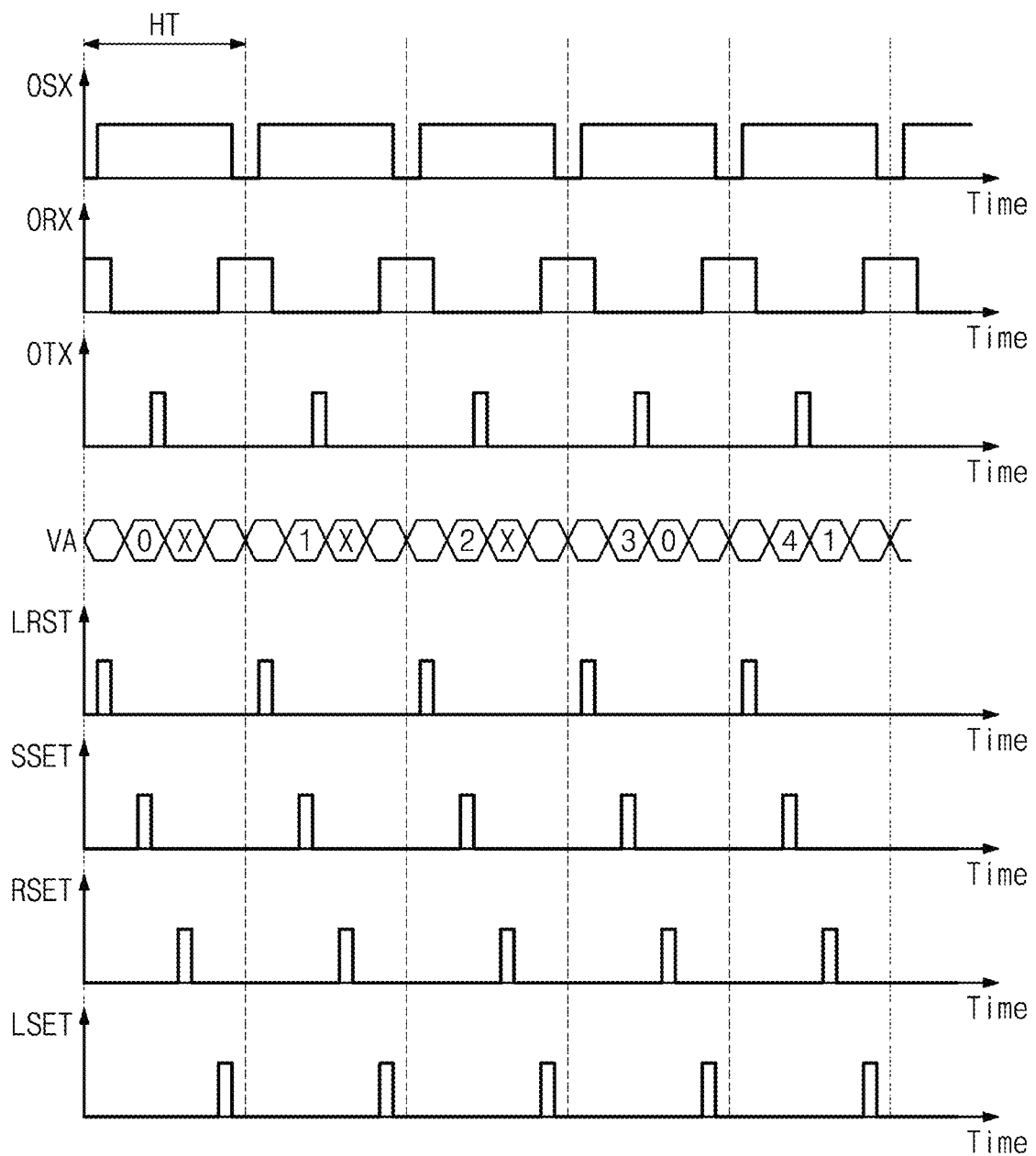
FIG. 12 is a timing diagram of signals input to a front buffer according to an example embodiment.

FIG. 12 is a timing diagram of signals input to a front buffer according to an example embodiment. For example, the timing diagram of signal may be input to the front buffer of FIG. 11. FIG. 12 shows the address VA, the transfer transistor operating information OTX, the reset transistor operating information ORX, the selection transistor operating information OSX, the latch set signal LSET, the shutter set signal SSET, the read set signal RSET, and the latch reset signal LRST over time. The input signals of FIG. 12 may be provided to perform the operation of FIG. 3.

The address VA sequentially directs rows where the shutter operation and the read operation are performed. The address VA directs a row where the shutter operation and the read operation are performed within the horizontal time HT in the time-division manner. As illustrated in FIG. 3, the address VA may sequentially direct rows from the 0-th row. The transfer transistor operating information OTX, the reset transistor operating information ORX, and the selection transistor operating information OSX may have waveforms that are repeated at a period of the horizontal time HT, as described with reference to FIG. 7.

The latch set signal LSET, the shutter set signal SSET, the read set signal RSET, and the latch reset signal LRST may have waveforms that are repeated at a period of the horizontal time HT. The shutter set signal SSET may have the enable level in a time period of the address VA directing the shutter operation for indicating that the shutter operation is directed. The read set signal RSET may have the enable level in a time period of the address VA directing the read operation for indicating that the read operation is directed. Depending on the shutter set signal SSET or the read set signal RSET, the latch set signal LSET and the latch reset signal LRST may be used to generate a shutter signal or a read signal having the enable level during the time period of the horizontal time HT.

Figure 13:
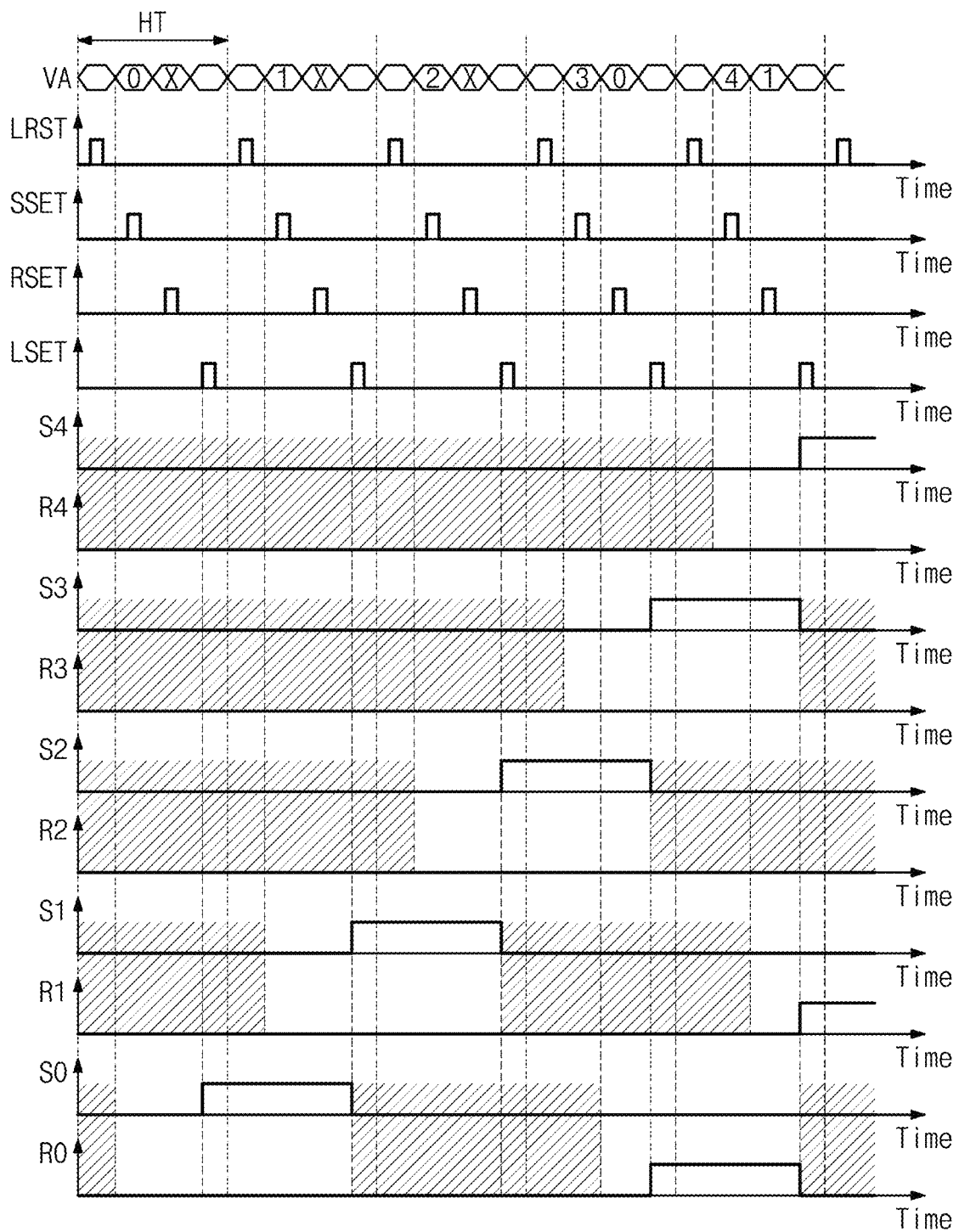
FIG. 13 is a timing diagram of signals generated by a latch according to an example embodiment.

FIG. 13 is a timing diagram of signals generated by a latch according to an example embodiment. For example, the timing diagram of signals may be provided to the latch of FIG. 11. FIG. 13 shows the shutter signals S0, S1, S2, S3, and S4 and the read signals R0, R1, R2, R3, and R4 over time. The row decoder 220b may decode the address VA and may generate the operation directing signals DVAs respectively corresponding to rows. For example, an operation directing signal corresponding to the first row may have the enable level during a time, which directs the shutter operation of the first row, of the second horizontal time HT and may have the enable level during a time, which directs the read operation of the first row, of the fifth horizontal time HT. The latch 250b may generate the shutter signals S0, S1, S2, S3, and S4 and the read signals R0, R1, R2, R3, and R4 by using the operation directing signals DVAs and latch information.

Referring to FIG. 13, when the address VA directs the shutter operation of a target row, the shutter set signal SSET may detect the operation directing signal of enable level. For example, the latch 250b may detect the shutter set signal SSET of the enable level. After the detection, each of the shutter signals S0 to S4 having the enable level may be generated during the time interval of the horizontal time HT in synchronization with a time when the latch set signal LSET has the enable level. When the address VA directs the read operation of a target row, the read set signal RSET may detect the operation direction signal of enable level, the latch 250b may detect the read set signal RSET of the enable level. After the detection, each of the read signals R0 to R4 having the enable level may be generated during the time interval of the horizontal time HT in synchronization with a time when the latch set signal LSET has the enable level.

A time from a time point when each of the operation directing signals DVAs starts to direct the shutter operation to a time point when the enable level of each of the shutter signals S0 to S4 ends may be referred to as the shutter time. A time from a time point when each of the operation directing signals DVAs starts to direct the read operation to a time point when the enable level of each of the read signals R0 to R4 ends may be referred to as the read time. The shutter time and the read time may be differently determined for each row.

In each row, a time corresponding to a shading portion of FIG. 13 indicates an idle time. In the case where operations for driving the pixel array 100 include only the shutter and read operations, on a row basis, the idle time may correspond to the remaining time of the driving time of the image sensor 1000 other than the shutter time and the read time. However, in the case where an additional operation of the pixel array 100 is performed on a row basis, the idle time may correspond to the remaining time of the driving time of the image sensor 1000 other than the shutter time and the read time and a time for the additional operation. Like the shutter time and the read time, idle times of rows may be determined to be different from each other.

Figure 14:
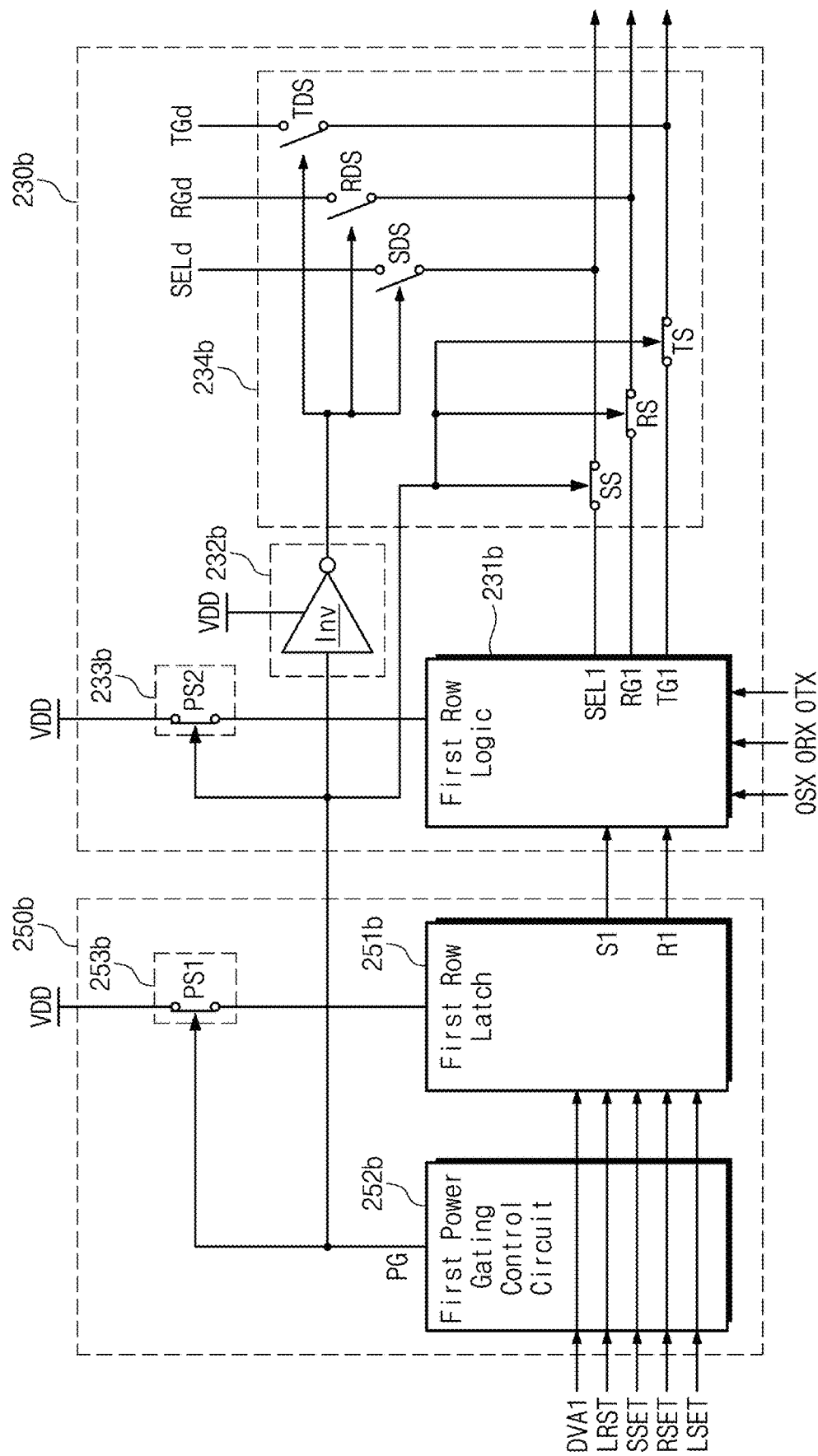
FIG. 14 is a circuit diagram of a digital logic circuit and a latch according to an example embodiment.

FIG. 14 is a circuit diagram of a digital logic circuit and a latch according to an example embodiment. For example, the circuit diagram of FIG. 14 may correspond to the digital logic circuit and the latch of FIG. 11. The digital logic circuit 230b and the latch 250b of FIG. 14 may be understood as a structure that generates pixel control signals corresponding to a target row (e.g., a first row). Accordingly, a plurality of digital logic circuits 230b and a plurality of latches 250b may be provided such that a digital logic circuit 230b and a latch 250b is provided for each of the rows.

Referring to FIG. 14, the latch 250b may include a row latch (or a first row latch) 251b, a power gating control circuit (or a first power gating control circuit) 252b, and a first power gating circuit 253b. The digital logic circuit 230b may include a row logic circuit (or a first row logic circuit) 231b, a default level control circuit 232b, a second power gating circuit 233b, and an output circuit 234b.

The row latch 251b may generate the shutter signal S1 and the read signal R1 based on an operation directing signal DVA1, the shutter set signal SSET, the read set signal RSET, the latch set signal LSET, and the latch reset signal LRST. Levels of the shutter signal S1 and the read signal R1 are described with reference to FIG. 13. Generation of the shutter signal S1 and the read signal R1 by using the operation directing signal DVA1, the shutter set signal SSET, the read set signal RSET, the latch set signal LSET, and the latch reset signal LRST will be described with reference to FIG. 15.

The power gating control circuit 252b may generate the power gating signal PG based on the operation directing signal DVA1, the shutter set signal SSET, the read set signal RSET, the latch set signal LSET, and the latch reset signal LRST. The power gating signal PG may have the enable level during the shutter time and the read time and may have the disable level during the idle time. Generation of the power gating signal PG by using the operation directing signal DVA1, the shutter set signal SSET, the read set signal RSET, the latch set signal LSET, and the latch reset signal LRST will be described with reference to FIG. 15.

The first power gating circuit 253b may transfer the power supply voltage VDD to the row latch 251b based on the power gating signal PG. The first power gating circuit 253b may include a first power switch PS1 that is turned on based on the power gating signal PG of the enable level and is turned off based on the power gating signal PG of the disable level. The first power switch PS1 may transfer the power supply voltage VDD to the row latch 251b during the shutter time and the read time. The first power switch PS1 may not transfer the power supply voltage VDD to the row latch 251b during the idle time.

The row logic circuit 231b may generate pixel control signals based on the shutter signal S1, the read signal R1, and operating information. The operating information may include the transfer transistor operating information OTX, the reset transistor operating information ORX, and the selection transistor operating information OSX. The pixel control signals may include the transfer control signal TG, the reset control signal RG, and the selection signal SEL.

The second power gating circuit 233b may transfer the power supply voltage VDD to the row logic circuit 231b based on the power gating signal PG. The second power gating circuit 233b may include a second power switch PS2 that is turned on based on the power gating signal PG of the enable level and is turned off based on the power gating signal PG of the disable level. Both the first power gating circuit 253b and the second power gating circuit 233b may operate based on the power gating signal PG generated by the power gating control circuit 252b.

The default level control circuit 232b may include an inverter Inv that inverts the power gating signal PG. The output circuit 234b may transfer the pixel control signals to the row driver 240b based on the power gating signal PG. To this end, the output circuit 234b may include the first, second, and third output switches SS, RS, and TS. The output circuit 234b may further include the first, second, and third default switches SDS, RDS, and TDS such that the default signals SELd, RGd, and TGd are transferred to the row driver 240b. The first, second, and third default switches SDS, RDS, and TDS may operate based on an inverted power gating signal from the default level control circuit 232b.

Figure 15:
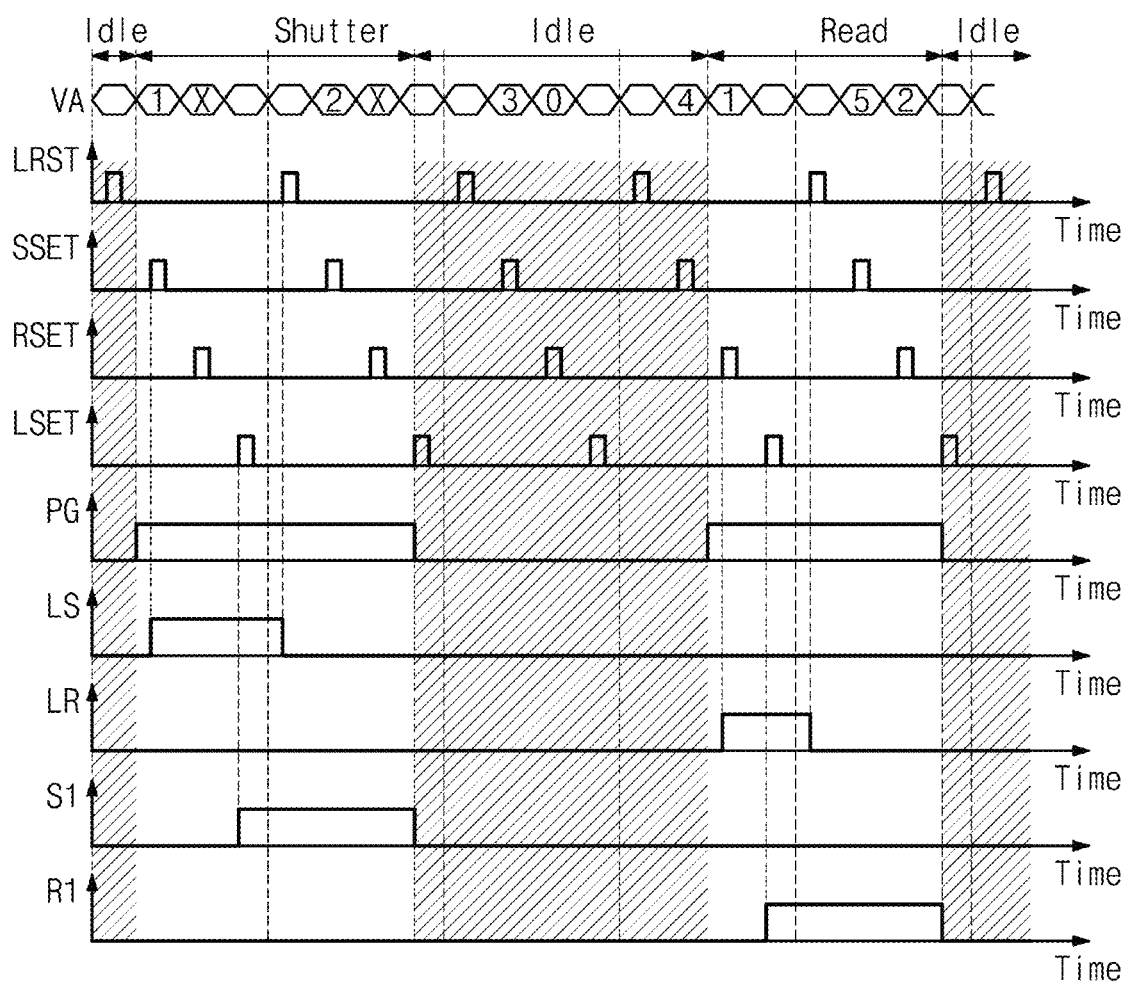
FIG. 15 is a timing diagram of latch signals according to an example embodiment.

FIG. 15 is a timing diagram of signals a latch according to an example embodiment. For example, the timing diagram of signals in FIG. 15 may correspond to the latch of FIG. 11. For example, the signal may be input to the latch or generated by the latch. FIG. 15 shows the address VA (or an operation directing signal), latch information, the power gating signal PG, intermediate signals LS and LR, the shutter signal S1, and the read signal R1 over time. It is assumed that an additional operation other than the shutter operation and the read operation is not performed.

The shutter signal S1 is generated based on the shutter set signal SSET, the latch set signal LSET, the latch reset signal LRST, and the operation directing signal. An operation directing signal directing the shutter operation of a target row may be latched by using the shutter set signal SSET. In response to the shutter set signal SSET, the first intermediate signal LS may have the enable level. The first intermediate signal LS of the enable level may be latched by using the latch set signal LSET. In response to the latch set signal LSET, the shutter signal S1 may have the enable level. In response to the latch reset signal LRST, the first intermediate signal LS may transition from the enable level to the disable level. The first intermediate signal LS of the disable level may be latched by using the latch set signal LSET. In response to the latch set signal LSET, the shutter signal S1 may have the disable level.

The read signal R1 is generated based on the read set signal RSET, the latch set signal LSET, the latch reset signal LRST, and the operation directing signal. An operation directing signal directing the read operation of a target row may be latched by using the read set signal RSET. In response to the read set signal RSET, the second intermediate signal LR may have the enable level. The second intermediate signal LR of the enable level may be latched by using the latch set signal LSET. In response to the latch set signal LSET, the read signal R1 may have the enable level.

In response to the latch reset signal LRST, the second intermediate signal LR may transition from the enable level to the disable level. The second intermediate signal LR of the disable level may be latched by using the latch set signal LSET. In response to the latch set signal LSET, the read signal R1 may have the disable level.

The power gating signal PG is generated based on the read set signal RSET, the shutter set signal SSET, the latch set signal LSET, the latch reset signal LRST, and the operation directing signal. In response to the operation directing signal directing the shutter operation or the read operation, the power gating signal PG may have the enable level. The operation directing signal directing the shutter operation or the read operation of the target row may be latched by using the shutter set signal SSET or the read set signal RSET. In response to the shutter set signal SSET or the read set signal RSET, the first intermediate signal LS or the second intermediate signal LR may have the enable level. In response to the latch reset signal LRST, the first intermediate signal LS or the second intermediate signal LR may transition from the enable level to the disable level. The first intermediate signal LS or the second intermediate signal LR of the disable level may be latched by using the latch set signal LSET. As such, the power gating signal PG may have the disable level.

A time when the power gating signal PG has the disable level is referred to as an idle time. During the idle time, a power is not provided to the row latch 251b and the row logic circuit 231b based on the power gating signal PG.

Figure 16:
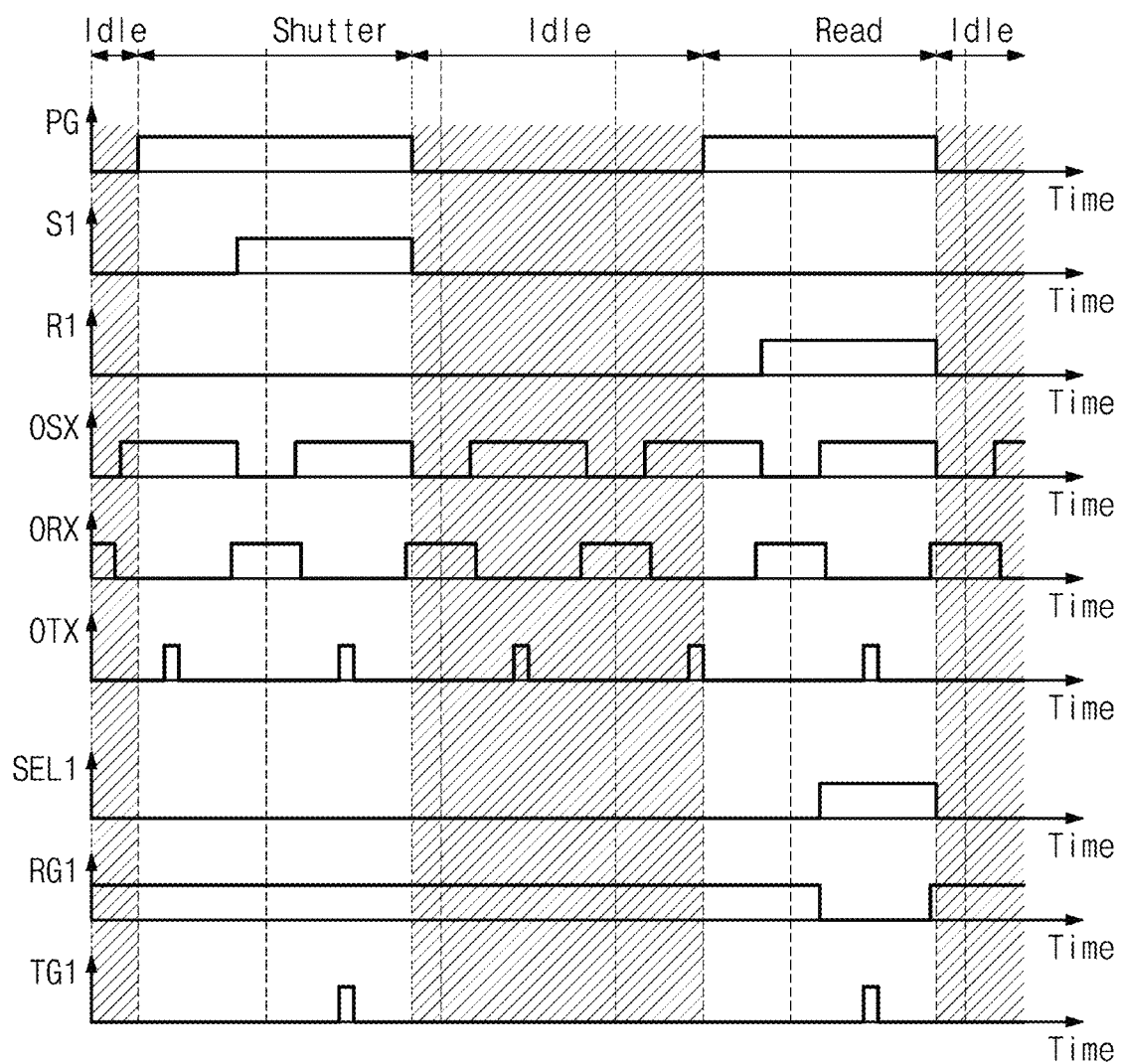
FIG. 16 is a timing diagram of digital logic circuit signals according to an example embodiment.

FIG. 16 is a timing diagram of signals input to a digital logic circuit of FIG. 11 or generated by the digital logic circuit. FIG. 16 shows the power gating signal PG, the shutter signal S1, the read signal R1, operating information, and pixel control signals over time. For convenience of description, signals for generating pixel control signals corresponding to a target row (e.g., a first row) are illustrated. It is assumed that an additional operation other than the shutter operation and the read operation is not performed.

During the shutter time, the row logic circuit 231b may generate the transfer control signal TG1 based on the transfer transistor operating information OTX. During the read time, the row logic circuit 231b may generate the transfer control signal TG1, the reset control signal RG1, and the selection signal SEL1 based on the transfer transistor operating information OTX, the reset transistor operating information ORX, and the selection transistor operating information OSX.

During the idle time, power is not provided to the row logic circuit 231b based on the power gating signal PG. Accordingly, the row logic circuit 231b may not output pixel control signals of any level. However, the output circuit 234b may provide default levels of the pixel control signals to the row driver 240b such that the pixel control signals are maintained at the default levels during the idle time. The power gating signal PG may be generated by the latch 250b and may be transferred to the digital logic circuit 230b.

Figure 17:
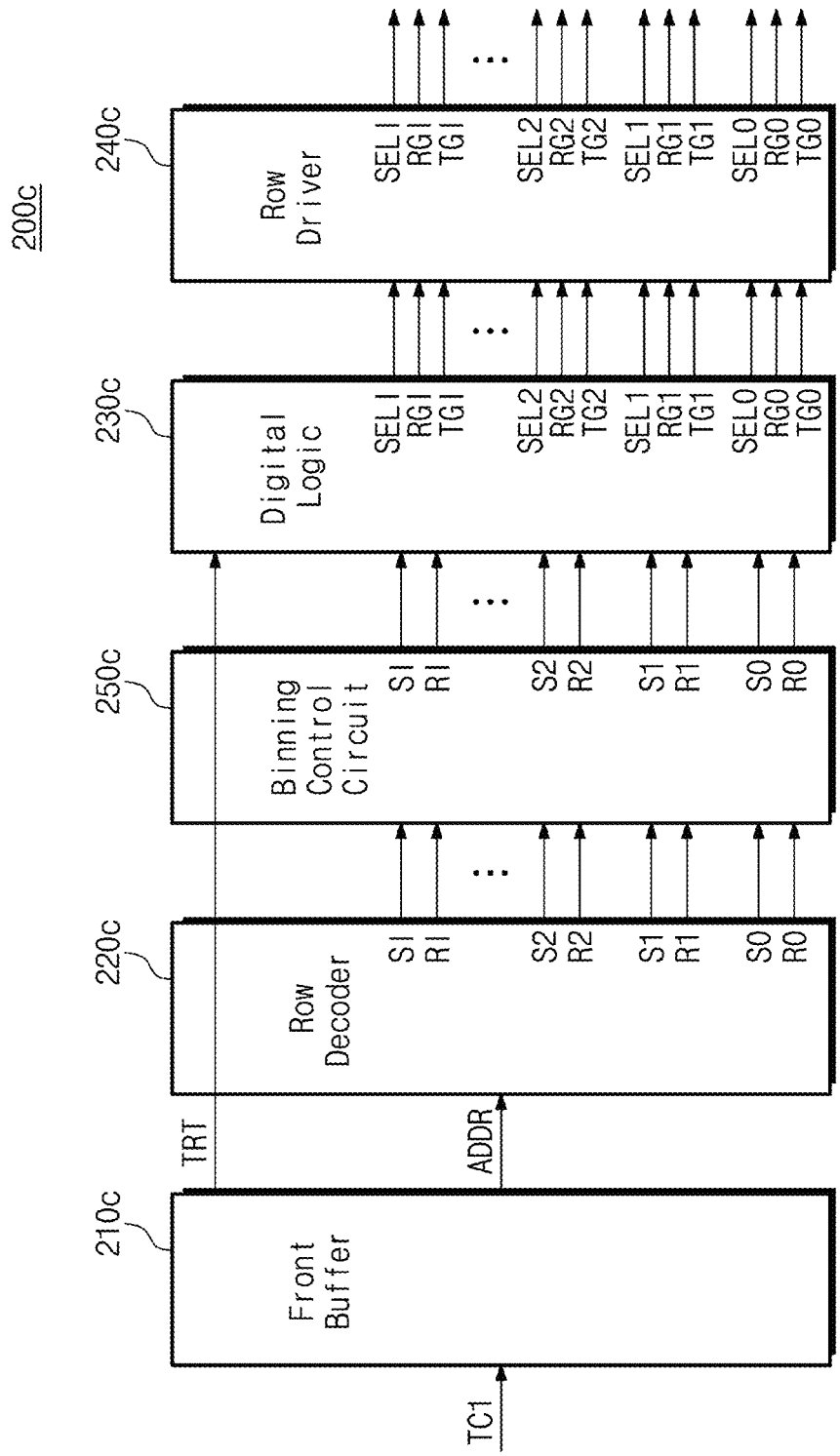
FIG. 17 is a block diagram of a driver circuit according to an example embodiment.

FIG. 17 is a block diagram of a driver circuit according to an example embodiment. For example, the block diagram of FIG. 17 may correspond to the driver circuit of FIG. 1. Referring to FIG. 17, a driver circuit 200c includes a front buffer 210c, a row decoder 220c, a digital logic circuit 230c, a row driver 240c, and a binning control circuit 250c. With regard to the front buffer 210c, the row decoder 220c, the digital logic circuit 230c, and the row driver 240c, additional description will be omitted to avoid redundancy.

The binning control circuit 250c may perform binning on operation directing information corresponding to a plurality of rows, based on operation directing information decoded by the row decoder 220c. As such, two or more rows may operate at the same timing. The binning control circuit 250c may be applied to the driver circuits 200a and 200b of FIGS. 6 and 11.

Figure 18:
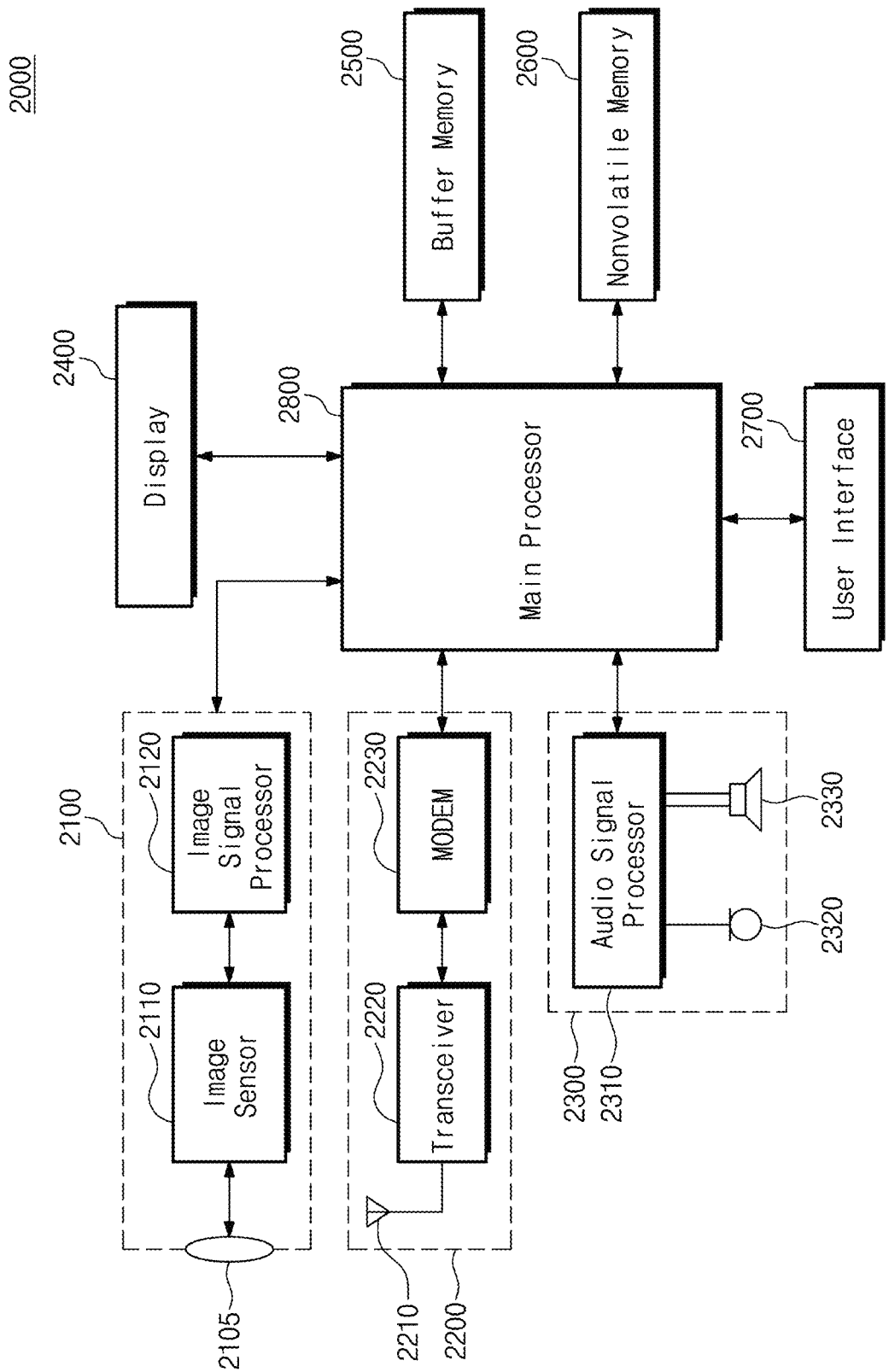
FIG. 18 is a block diagram of an electronic system according to an example embodiment.

FIG. 18 is a block diagram of an electronic system according to an example embodiment. For example, the electronic system of FIG. 18 may include the image sensor of FIG. 1. Referring to FIG. 18, an electronic system 2000 may be variously implemented with a desktop computer, a laptop computer, a tablet computer, a smartphone, a wearable device, or an electric vehicle. The electronic system 2000 may include an image system 2100, a communication system 2200, an audio processing system 2300, a display system 2400, a buffer memory 2500, a nonvolatile memory 2600, a user interface 2700, and a main processor 2800.

The image system 2100 may receive a light through a lens 2105. An image sensor 2110 included in the image system 2100 may generate image data based on the received light, and an image signal processor 2120 included therein may process the image data for displaying the image data. The image sensor 2110 may be the image sensor 1000 described with reference to FIGS. 1 to 16. For example, the image sensor 2110 may include the driver circuit 200, 200a, 200b, or 200c described above.

The communication system 2200 may exchange signals with an external device/system through an antenna 2210. A transceiver 2220 and a MODEM (Modulator/Demodulator) 2230 of the communication system 2200 may process signals, which are exchanged with the external device/system, in compliance with various wireless communication protocols.

The audio processing system 2300 may process sound information by using an audio signal processor 2310, thus playing and outputting audio. The audio processing system 2300 may receive an audio input through a microphone 2320. The audio processing system 2300 may output the played audio through a speaker 2330.

The display system 2400 may receive data from an external device (e.g., the main processor 2800) and may display an image through a display panel based on the received data. For example, the display system 2400 may display the image generated by the image signal processor 2120.

The buffer memory 2500 may store data to be used for an operation of the electronic system 2000. In an example embodiment, the buffer memory 2500 may temporarily store data processed or to be processed by the main processor 2800. In an example embodiment, the buffer memory 2500 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 2600 may store data regardless of whether a power is supplied. In an example embodiment, the nonvolatile memory 2600 may include at least one of various nonvolatile memories such as a flash memory, a PRAM, an MRAM, a ReRAM, and a FRAM. In an example embodiment, the nonvolatile memory 2600 may include a removable memory such as a secure digital (SD) card, and/or an embedded memory such as an embedded multimedia card (eMMC).

The user interface 2700 may perform communication arbitration between a user and the electronic system 2000. In an example embodiment, the user interface 2700 may include input interfaces such as a keypad, a button, a touch screen, a touch pad, a gyroscope sensor, a vibration sensor, and an acceleration sensor. In an example embodiment, the user interface 2700 may include output interfaces such as a motor and a LED lamp.

The main processor 2800 may control overall operations of the components of the electronic system 2000. The main processor 2800 may process various operations for operating the electronic system 2000. For example, the main processor 2800 may be implemented with an operation processing device/circuit, which includes one or more processor cores, such as a general-purpose processor, a special-purpose processor, an application processor, or a microprocessor.

According to an example embodiment, an image sensor driver circuit including a power switch and an image sensor including the driver circuit may prevent a power from being supplied to a digital logic circuit during a time when a specific operation is not performed, thus preventing an increase in a leakage current, power consumption, and a temperature of the driver circuit.

At least one of the driver circuit, converting circuit, output buffer, timing controller, NOR gate, inverter, row logic, front buffer, row decoder, latch, digital logic, row driver, power gating control circuit, binning control circuit or other element represented by a block as illustrated in FIGS. 1, 5, 6, 9, 11, 14, 17 and 18 may be embodied as various numbers of hardware, software and/or firmware structures that execute respective functions described above, according to an exemplary embodiment. For example, at least one of the driver circuit, converting circuit, output buffer, timing controller, NOR gate, inverter, row logic, front buffer, row decoder, latch, digital logic, row driver, power gating control circuit, binning control circuit or other element may use a direct circuit structure, such as a memory, a processor, a logic circuit, a look-up table, etc. that may execute the respective functions through controls of one or more microprocessors or other control apparatuses. Also, at least one of the driver circuit, converting circuit, output buffer, timing controller, NOR gate, inverter, row logic, front buffer, row decoder, latch, digital logic, row driver, power gating control circuit, binning control circuit or other element may be specifically embodied by a module, a program, or a part of code, which contains one or more executable instructions for performing specified logic functions, and executed by one or more microprocessors or other control apparatuses. Also, at least one of the driver circuit, converting circuit, output buffer, timing controller, NOR gate, inverter, row logic, front buffer, row decoder, latch, digital logic, row driver, power gating control circuit, binning control circuit or other element may further include or may be implemented by a processor such as a central processing unit (CPU) that performs the respective functions, a microprocessor, or the like. Two or more of the driver circuit, converting circuit, output buffer, timing controller, NOR gate, inverter, row logic, front buffer, row decoder, latch, digital logic, row driver, power gating control circuit, binning control circuit or other element may be combined into one single component, element, module or unit which performs all operations or functions of the combined two or more the driver circuit, converting circuit, output buffer, timing controller, NOR gate, inverter, row logic, front buffer, row decoder, latch, digital logic, row driver, power gating control circuit, binning control circuit or other element. Also, at least part of functions of at least one of the driver circuit, converting circuit, output buffer, timing controller, NOR gate, inverter, row logic, front buffer, row decoder, latch, digital logic, row driver, power gating control circuit, binning control circuit or other element may be performed by another of these components. Further, although a bus is not illustrated in each of the above block diagrams, communication between the components may be performed through the bus. Functional aspects of the above example embodiments may be implemented in algorithms that execute on one or more processors. Furthermore, the driver circuit, converting circuit, output buffer, timing controller, NOR gate, inverter, row logic, front buffer, row decoder, latch, digital logic, row driver, power gating control circuit, binning control circuit or other element represented by a block or processing steps may employ any number of related art techniques for electronics configuration, signal processing and/or control, data processing and the like.

While example embodiments have been described with reference to the accompanying drawings, it will be apparent to those of ordinary skill in the art that various changes and modifications may be made thereto without departing from the spirit and scope of the inventive concept as set forth in the following claims.

What is claimed is:

1. A driver circuit of an image sensor, comprising:
    a row decoder configured to decode an address directing a target row of a pixel array and generate an operation directing signal corresponding to the target row;
    a digital logic circuit comprising:
        a target row logic circuit configured to generate a pixel control signal corresponding to the target row based on a power supply voltage and the operation directing signal;
        a power switch configured to connect the power supply voltage to the target row logic circuit during a first time and isolate the power supply voltage from the target row logic circuit during a second time, based on the operation directing signal; and
        an output circuit configured to output a default signal during the second time based on the operation directing signal; and
    a row driver configured to drive the target row of the pixel array based on the pixel control signal during the first time and drive the target row of the pixel array based on the default signal during the second time.

2. The driver circuit of claim 1, wherein the digital logic circuit further comprises a power gating control circuit configured to generate a power gating signal having an enable level during the first time and having a disable level during the second time, based on the operation directing signal, and
    wherein the power switch is configured to turn on based on the enable level of the power gating signal and turn off based on the disable level of the power gating signal.

3. The driver circuit of claim 1, wherein the address comprises a first address directing a first row of the pixel array, at which a first operation is performed, and a second address directing a second row of the pixel array, at which a second operation is performed,
    wherein the row decoder comprises:
        a first row decoder configured to decode the first address and generate a first operation directing signal directing the first operation to be performed at the target row; and
        a second row decoder configured to decode the second address and generate a second operation directing signal directing the second operation to be performed at the target row, and wherein the first time is-comprises a first operation time when the first operation directing signal has an enable level and a second operation time when the second operation directing signal has an enable level.

4. The driver circuit of claim 3, wherein the first operation directing signal and the second operation directing signal have an enable level during a time interval, and
wherein, during the time interval, the power switch is configured to maintain a current state.

5. The driver circuit of claim 3, wherein the first operation comprises a shutter operation for resetting charges integrated by a light sensing operation of the pixel array, and the second operation comprises an operation of reading a pixel signal generated by a light sensing operation of the pixel array after the charges are reset by the first operation.

6. The driver circuit of claim 1, further comprising:
a latch configured to output an operating signal to the target row logic circuit based on the operation directing signal,
wherein the target row logic circuit is further configured to generate the pixel control signal based on the operating signal received from the latch, and
wherein the latch comprises:
a power gating control circuit configured to generate a power gating signal having an enable level during the first time and a disable level during the second time, based on the operation directing signal;
a target row latch configured to latch the operation directing signal and generate the operating signal having an enable level during a portion of the first time; and
a second power switch configured to connect the power supply voltage to the target row latch during the first time and isolate the power supply voltage from the target row latch during the second time, based on the power gating signal.

7. The driver circuit of claim 6, wherein the row decoder is further configured to decode the address and generate the operation directing signal having an enable level during a third time directing a first operation to be performed at the target row and a fourth time directing a second operation to be performed at the target row,
wherein the target row latch is further configured to detect the enable level of the operation directing signal and generate a first operating signal having an enable level during a fifth time after the third time and a second operating signal having an enable level during a sixth time after the fourth time, and
wherein the first time comprises the third to sixth times.

8. A driver circuit of an image sensor, comprising:
a row decoder configured to decode an address and generate an operation directing signal having an enable level during a first time directing an operation of a target row of a pixel array;
a latch comprising:
a target row latch configured to detect the operation directing signal of the first time and to generate an operating signal having an enable level during a second time after the first time, based on the operation directing signal of the first time;
a power gating control circuit configured to generate a power gating signal based on the operation directing signal; and
a first power switch configured to connect a power supply voltage to the target row latch during the first time and the second time based on the power gating signal; and a digital logic circuit comprising:
a target row logic circuit configured to generate a pixel control signal corresponding to the target row based on the power supply voltage and the operating signal; and
a second power switch configured to connect the power supply voltage to the target row logic circuit during the first time and the second time based on the power gating signal.

9. The driver circuit of claim 8, wherein the target row latch is further configured to generate the operating signal having an enable level during the second time of a horizontal time interval based on a latch set signal having a period of the horizontal time interval, after detecting the operation directing signal of the first time.

10. The driver circuit of claim 8, wherein the target row latch is further configured to latch the operation directing signal of the first time by using an operation set signal to generate an intermediate signal having an enable level, latch the intermediate signal of an enable level by using a latch set signal to change a level of the operating signal from a disable level to an enable level, change a level of the intermediate signal from an enable level to a disable level based on a latch reset signal, and latch the intermediate signal of a disable level by using the latch set signal to change the operating signal from an enable level to a disable level.

11. The driver circuit of claim 8, wherein the power gating control circuit is further configured to generate the power gating signal having an enable level based on the operation directing signal, latch the operation directing signal of the first time by using an operation set signal to generate an intermediate signal having an enable level, change a level of the intermediate signal from an enable level to a disable level based on a latch reset signal, and latch the intermediate signal of a disable level by using a latch set signal to change a level of the power gating signal from an enable level to a disable level.

12. The driver circuit of claim 8, wherein the power gating control circuit is further configured to output the power gating signal having an enable level to the first power switch and the second power switch during a third time, the third time being a time from a start point of the first time to an end point of the second time.

13. The driver circuit of claim 12, wherein the power gating control circuit is further configured to turn the first and second power switches off during a fourth time, which is different from the third time, of a driving time of the pixel array which is driven based on the pixel control signal.

14. The driver circuit of claim 12, further comprising:
a row driver configured to drive the pixel array based on the pixel control signal,
wherein the digital logic circuit further comprises an output circuit configured to provide the pixel control signal to the row driver during the third time based on the power gating signal and provide a default signal to the row driver during a fourth time different from the third time based on the power gating signal.

15. The driver circuit of claim 8, wherein the row decoder is further configured to decode the address to generate the operation directing signal having an enable level during a third time directing a first operation to be performed at the target row and a fourth time directing a second operation to be performed at the target row,
wherein the target row latch is further configured to detect the operation directing signal of the third time based on a first set signal and detect the operation directing signal of the fourth time based on a second set signal, wherein the first time comprises the third time and the fourth time, wherein the third time and the fourth time are shorter than a horizontal time interval, wherein the first set signal and the second set signal have a period that corresponds to the horizontal time interval, and wherein a phase of the first set signal is different from a phase of the second set signal.

16. An image sensor comprising:
a pixel array comprising a plurality of pixels;
a driver circuit connected to rows of the pixel array through row lines, the driver circuit being configured to control a first operation and a second operation of each of the rows; and
a converting circuit connected to columns of the pixel array through column lines, the converting circuit being configured to receive an image signal from the pixel array through the column lines and convert the received image signal into a digital image signal, in accordance with the first operation and the second operation of the pixel array,
wherein the driver circuit comprises:
 a row decoder configured to decode an address directing a target row of the pixel array, at which the first operation and the second operation are performed, and generate an operation directing signal corresponding to the target row;
 a digital logic circuit comprising:
  a target row logic circuit configured to generate a pixel control signal corresponding to the target row based on a power supply voltage and the operation directing signal; and
  a power switch configured to connect the power supply voltage to the target row logic circuit based on the operation directing signal while the target row logic circuit generates the pixel control signal corresponding to the first operation and the second operation; and
 a row driver configured to control the first operation and the second operation of the target row, based on the pixel control signal.

17. The image sensor of claim 16, wherein the address comprises a first address directing a first row of the pixel array, at which the first operation is performed, and a second address directing a second row of the pixel array, at which the second operation is performed,
wherein the row decoder comprises:
 a first row decoder configured to decode the first address and generate a first operation directing signal having an enable level during a first time directing the first operation of the target row; and
 a second row decoder configured to decode the second address and generate a second operation directing signal having an enable level during a second time directing the second operation of the target row, and wherein the driver circuit further comprises a power gating control circuit configured to turn on the power switch during the first time and the second time based on the first operation directing signal and the second operation directing signal.

18. The image sensor of claim 16, wherein the row decoder is further configured to decode the address and generate the operation directing signal having an enable level during a first time directing the first operation of the target row and a second time directing the second operation of the target row,
wherein the driver circuit further comprises:
 a target row latch configured to detect the operation directing signal of the first time, generate a first operating signal having an enable level during a third time after the first time, and generate a second operating signal having an enable level during a fourth time after the second time;
 a power gating control circuit configured to generate a power gating signal based on the operation directing signal; and
 a latch power switch configured to connect the power supply voltage to the target row latch during the first to fourth times based on the power gating signal, and
wherein the power switch and the latch power switch are turned on or turned off based on the power gating signal.

19. The image sensor of claim 18, wherein the first operation comprises a shutter operation for resetting charges integrated by a light sensing operation of the pixel array, and the second operation comprises an operation of reading a pixel signal generated by a light sensing operation of the pixel array after the charges are reset by the first operation, and
wherein the pixel control signal comprises:
 a transfer control signal configured to turn on a transfer transistor of each of pixels of the target row in the first operation and the second operation such that the integrated charges are provided to a floating diffusion area;
 a reset control signal configured to turn off a reset transistor of each pixel of the target row in the second operation such that the provided charges are integrated at the floating diffusion area; and
 a selection signal configured to turn on a selection transistor of each pixel of the target row in the second operation such that a pixel signal generated based on the charges integrated at the floating diffusion area is transferred to the converting circuit.

20. The image sensor of claim 16, wherein the driver circuit further comprises a binning control circuit configured to perform binning on the operation directing signal corresponding to the target row and another operation directing signal corresponding to another row of the pixel array such that the target row and the another row perform the first operation and the second operation together.

* * * * *